United States Patent
Leonard et al.

(10) Patent No.: US 7,871,106 B2
(45) Date of Patent: Jan. 18, 2011

(54) METHOD AND APPARATUS RELATED TO TRANSPORTABILITY OF A VEHICLE

(75) Inventors: Joshua J Leonard, North Branch, MN (US); Eric Bjerketvedt, North Branch, MN (US); Robert Bradley Morisch, Lindstrom, MN (US); Brian D Krosschell, Chisago, MN (US); James Bergman, Oslo, MN (US); Larry Holter, Alvarado, MN (US); Richard Nelson, Oslo, MN (US); Lionel Hoff, Oslo, MN (US); Doug Moman, Warren, MN (US); Mitchell D. Johnson, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 313 days.

(21) Appl. No.: 12/050,041

(22) Filed: Mar. 17, 2008

(65) Prior Publication Data

US 2009/0000849 A1    Jan. 1, 2009

Related U.S. Application Data

(60) Provisional application No. 60/918,500, filed on Mar. 16, 2007.

(51) Int. Cl.
    *B60R 21/13* (2006.01)
(52) U.S. Cl. .................. 280/756; 180/208; 296/219
(58) Field of Classification Search ............ 180/311, 180/208; 280/756; 414/809, 541, 543, 545, 414/539, 540; 244/138 R, 137.1, 118.1, 244/136; 16/443; 296/97.8, 28, 219
    See application file for complete search history.

(56) References Cited

U.S. PATENT DOCUMENTS

| | | | |
|---|---|---|---|
| 2,672,103 | A | 3/1954 | Hohmes |
| 3,858,902 | A | 1/1975 | Howells et al. |
| 4,027,892 | A | 6/1977 | Parks |
| 4,098,414 | A | 7/1978 | Abiera |
| 4,561,323 | A | 12/1985 | Stromberg |
| 4,821,825 | A | 4/1989 | Somerton-Rayner |
| 4,934,737 | A | 6/1990 | Nakatsuka |
| 5,036,939 | A | 8/1991 | Johnson et al. |
| 5,251,713 | A | 10/1993 | Enokimoto |

(Continued)

FOREIGN PATENT DOCUMENTS

CH        317 335 A    11/1956

(Continued)

OTHER PUBLICATIONS

International Preliminary Report on Patentability for PCT/US2008/003483 issued by the European Patent Office on May 11, 2009.

(Continued)

*Primary Examiner*—Paul N Dickson
*Assistant Examiner*—Karen A Beck
(74) *Attorney, Agent, or Firm*—Baker & Daniels LLP

(57) ABSTRACT

A vehicle is disclosed. The vehicle may include a plurality of attachment devices to couple the vehicle to a harness. The vehicle may include a moveable roll cage which is moveable from a raised position to a lowered position.

20 Claims, 27 Drawing Sheets

U.S. PATENT DOCUMENTS

| | | | |
|---|---|---|---|
| 5,393,194 A * | 2/1995 | Smith | 414/546 |
| 5,573,300 A * | 11/1996 | Simmons | 296/193.04 |
| 5,863,277 A | 1/1999 | Melbourne | |
| 5,950,750 A | 9/1999 | Dong et al. | |
| 6,029,750 A * | 2/2000 | Carrier | 169/52 |
| 6,092,877 A | 7/2000 | Rasidescu et al. | |
| 6,149,540 A | 11/2000 | Johnson et al. | |
| 6,199,894 B1 | 3/2001 | Anderson | |
| 6,467,787 B1 | 10/2002 | Marsh | |
| 6,622,968 B1 | 9/2003 | St. Clair et al. | |
| 6,695,566 B2 * | 2/2004 | Rodriguez Navio | 414/538 |
| 6,725,962 B1 | 4/2004 | Fukuda | |
| 6,752,235 B1 | 6/2004 | Bell et al. | |
| 6,786,526 B1 | 9/2004 | Blalock | |
| 6,799,779 B2 | 10/2004 | Shibayama | |
| 6,799,781 B2 | 10/2004 | Rasidescu et al. | |
| 6,916,142 B2 | 7/2005 | Hansen et al. | |
| 6,923,507 B1 | 8/2005 | Billberg et al. | |
| 6,978,857 B2 | 12/2005 | Korenjak | |
| 7,055,454 B1 | 6/2006 | Whiting et al. | |
| 7,124,853 B1 | 10/2006 | Kole, Jr. | |
| 7,125,134 B1 * | 10/2006 | Hedlund et al. | 362/106 |
| 7,165,702 B1 * | 1/2007 | Billberg | 224/401 |
| 7,222,882 B2 * | 5/2007 | Boucher | 280/756 |
| 7,237,789 B1 | 7/2007 | Herman | |
| 7,239,032 B1 | 7/2007 | Wilson et al. | |
| 7,240,960 B2 * | 7/2007 | Fallis et al. | 296/218 |
| 7,431,024 B2 | 10/2008 | Buchwitz et al. | |
| 7,568,732 B2 * | 8/2009 | Schlup, Jr. | 280/756 |
| 7,578,523 B2 * | 8/2009 | Kosuge et al. | 280/756 |
| 2002/0147072 A1 | 10/2002 | Goodell et al. | |
| 2002/0178968 A1 | 12/2002 | Christensen | |
| 2003/0001409 A1 | 1/2003 | Semple et al. | |
| 2004/0079561 A1 | 4/2004 | Ozawa et al. | |
| 2004/0108159 A1 | 6/2004 | Rondeau et al. | |
| 2004/0195797 A1 | 10/2004 | Nash et al. | |
| 2005/0073140 A1 * | 4/2005 | Boucher | 280/756 |
| 2005/0173177 A1 | 8/2005 | Smith et al. | |
| 2005/0173180 A1 | 8/2005 | Hypes et al. | |
| 2005/0248116 A1 | 11/2005 | Fanson | |
| 2006/0043754 A1 * | 3/2006 | Smith | 296/98 |
| 2007/0290493 A1 * | 12/2007 | David | 280/756 |
| 2008/0023240 A1 | 1/2008 | Sunsdahl et al. | |
| 2008/0023249 A1 | 1/2008 | Sunsdahl et al. | |
| 2010/0090430 A1 * | 4/2010 | Weston | 280/87.01 |

FOREIGN PATENT DOCUMENTS

| | | |
|---|---|---|
| DE | 116 605 C | 2/1900 |
| DE | 17 55 101 A1 | 4/1971 |
| DE | 30 33 707 A | 4/1982 |
| EP | 0238077 A | 9/1987 |
| EP | 0 709 247 A | 5/1996 |
| EP | 0794096 A | 9/1997 |
| EP | 1 215 107 A | 6/2002 |
| EP | 1557345 A | 7/2005 |
| EP | 1 564 123 A | 8/2005 |
| JP | 11 334447 A | 12/1999 |
| JP | 2000 177434 A | 6/2000 |

OTHER PUBLICATIONS

International Search Report and Written Opinion for PCT/US2008/003485 issued by the European Patent Office on Aug. 27, 2008.
International Search Report and Written Opinion for PCT/US2008/003480 issued by the European Patent Office on Sep. 1, 2008.
International Search Report and Written Opinion for PCT/US2008/003483 issued by the European Patent Office on Oct. 2, 2008.

* cited by examiner

METHOD AND APPARATUS RELATED TO TRANSPORTABILITY OF A VEHICLE

CROSS REFERENCE TO RELATED APPLICATIONS

This application claims the benefit of U.S. Provisional Application Ser. No. 60/918,500, filed Mar. 16, 2007, titled "METHOD AND APPARATUS RELATED TO TRANSPORTABILITY OF A VEHICLE", the disclosure of which is expressly incorporated by reference herein.

The present application is related to U.S. Provisional Application Ser. No. 60/918,502, filed Mar. 16, 2007, titled "VEHICLE", U.S. Provisional Application Ser. No. 60/918,556, filed Mar. 16, 2007, titled "VEHICLE", U.S. Provisional Application Ser. No. 60/918,444, filed Mar. 16, 2007, titled "VEHICLE WITH SPACE UTILIZATION", and U.S. Provisional Application Ser. No. 60/918,356, filed Mar. 16, 2007, titled "UTILITY VEHICLE HAVING MODULAR COMPONENTS", the disclosure of each being expressly incorporated by reference herein.

STATEMENT REGARDING FEDERALLY SPONSORED RESEARCH OR DEVELOPMENT

Portions of this application may be subject to the terms of contract number H92222-06-C-0039 with the United States Special Operations Command (SOCOM).

FIELD OF THE INVENTION

The present invention relates to a vehicle and in particular to a vehicle which may be used in an aerial drop.

BACKGROUND OF THE INVENTION

It is known to drop vehicles from an aircraft. Known vehicles are provided in U.S. Pat. No. 6,695,566 and US Published Application 20030164426.

SUMMARY OF THE INVENTION

In an exemplary embodiment of the present disclosure, a vehicle for use with a harness to support the vehicle when the vehicle is in the air is provided. The vehicle comprising a plurality of ground engaging members; a frame supported by the plurality of ground engaging members; an engine supported by the frame and operatively coupled to at least a portion of the plurality of ground engaging members; an operator area supported by the frame, the operator area including seating for at least two occupants in a side-by-side arrangement, steering controls operatively coupled to at least one of the plurality of ground engagement members, and engine controls operatively coupled to the engine; a first set of attachment devices positioned forward of the seating and coupled directly to the frame; and a second set of attachment devices positioned rearward of the seating and coupled directly to the frame. The first set of attachment devices and the second set of attachment devices being adapted to be removably coupled to the harness.

In another exemplary embodiment of the present disclosure, a vehicle for use with a harness to support the vehicle when the vehicle is in the air is provided. The vehicle comprising a plurality of ground engaging members; a frame supported by the plurality of ground engaging members; an engine supported by the frame and operatively coupled to at least a portion of the plurality of ground engaging members; an operator area supported by the frame, the operator area including seating for at least two occupants in a side-by-side arrangement, steering controls operatively coupled to at least one of the plurality of ground engagement members, and engine controls operatively coupled to the engine; a front cargo platform supported by the frame and located forward of the seating; a rear cargo platform supported by the frame and located rearward of the seating; a first set of attachment devices positioned forward of the seating and supported by the frame; and a second set of attachment devices positioned rearward of the seating and supported by the frame. The first set of attachment devices and the second set of attachment devices being adapted to be removably coupled to the harness.

In a further exemplary embodiment of the present disclosure, a vehicle for use with a harness to support the vehicle when the vehicle is in the air is provided. The vehicle comprising a plurality of ground engaging members; a frame supported by the plurality of ground engaging members; an engine supported by the frame and operatively coupled to at least a portion of the plurality of ground engaging members; an operator area supported by the frame, the operator area including seating for at least two occupants in a side-by-side arrangement, steering controls operatively coupled to at least one of the plurality of ground engagement members, and engine controls operatively coupled to the engine; and a roll cage supported by the frame. The roll cage having a raised position wherein the roll cage is positioned to protect the operator area and a lowered position. The seating remaining stationary as the roll cage is moved between the raised position and the lowered position. The steering controls and engine controls being accessible by an occupant when the roll cage is in the lowered position.

In yet another exemplary embodiment of the present disclosure, a method of loading a vehicle having a roll cage moveable between a raised position and a lowered position into a cargo space having a height of less than a height of the vehicle when the roll cage is in the raised position is provided. The method comprising steps of moving the roll cage from the raised position to the lowered position, the height of the vehicle being less than the height of the cargo area in with the roll cage in the lowered position; and driving the vehicle into the cargo area with an operator positioned in a seat of the vehicle.

BRIEF DESCRIPTION OF THE DRAWINGS

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, and golf carts.

Figure 1:
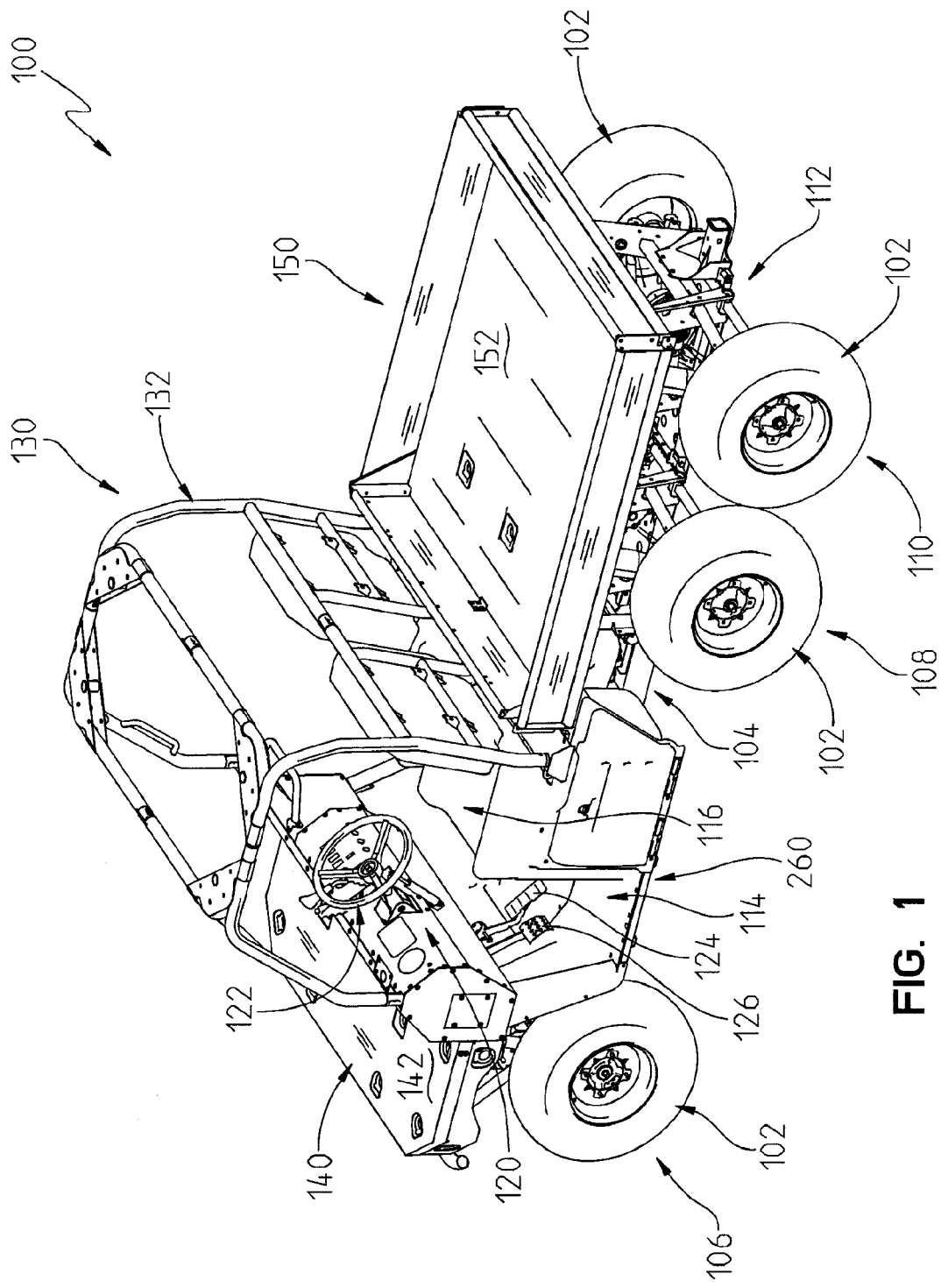
FIG. 1 is a rear, perspective view of a vehicle from a first side of the vehicle, the vehicle including a front platform and a rear platform.
Figure 2:
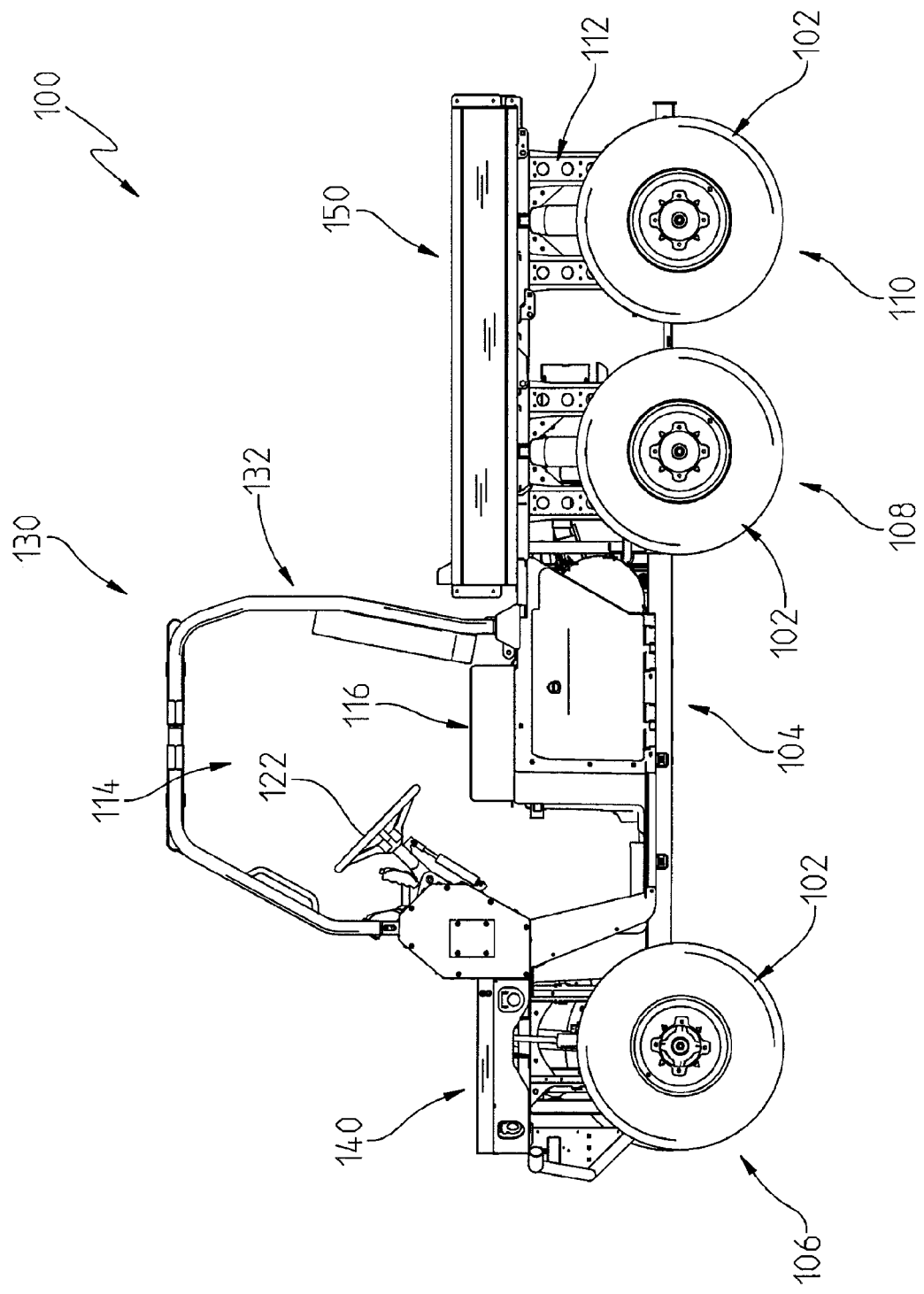
FIG. 2 is a side view of the first side of the vehicle of FIG. 1.
Figure 3:
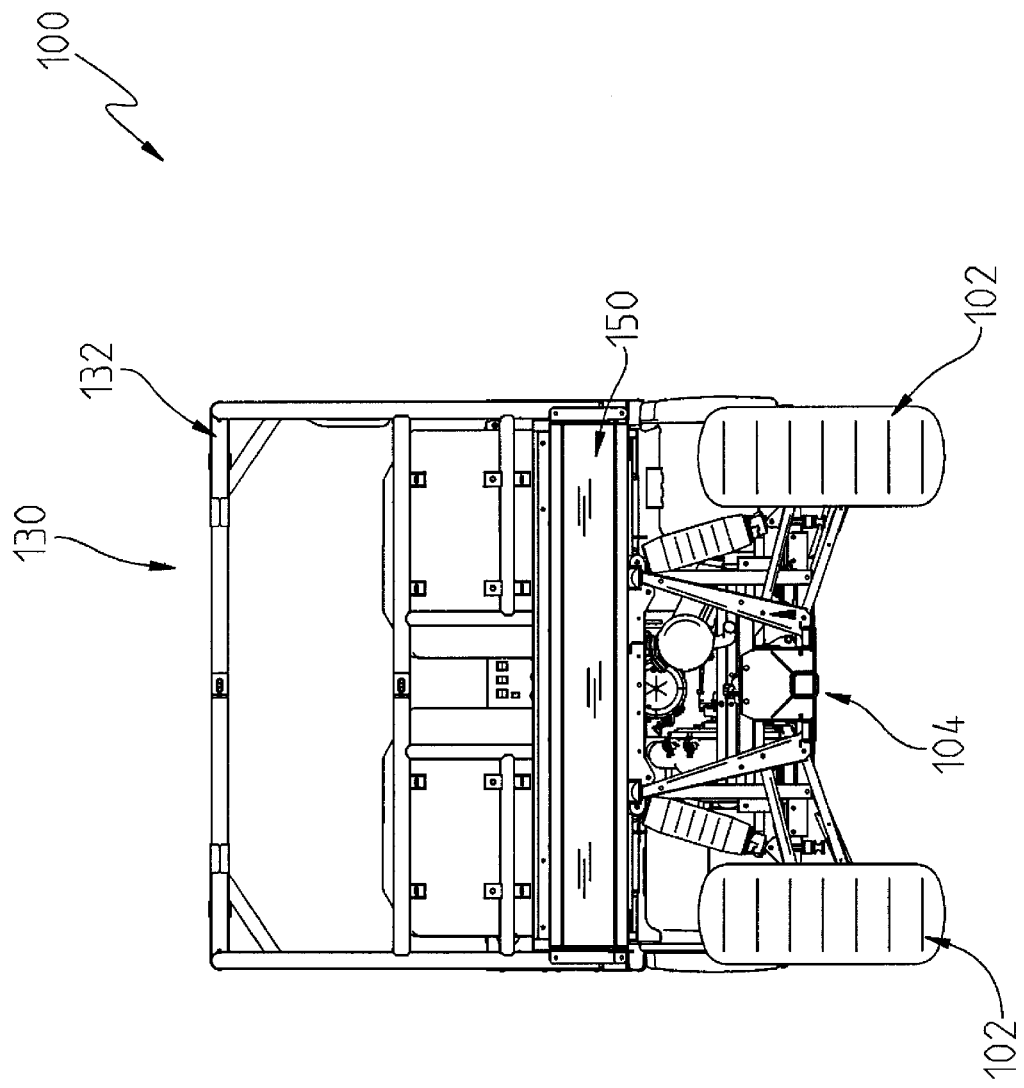
FIG. 3 is a rear view of the vehicle of FIG. 1.
Figure 4:
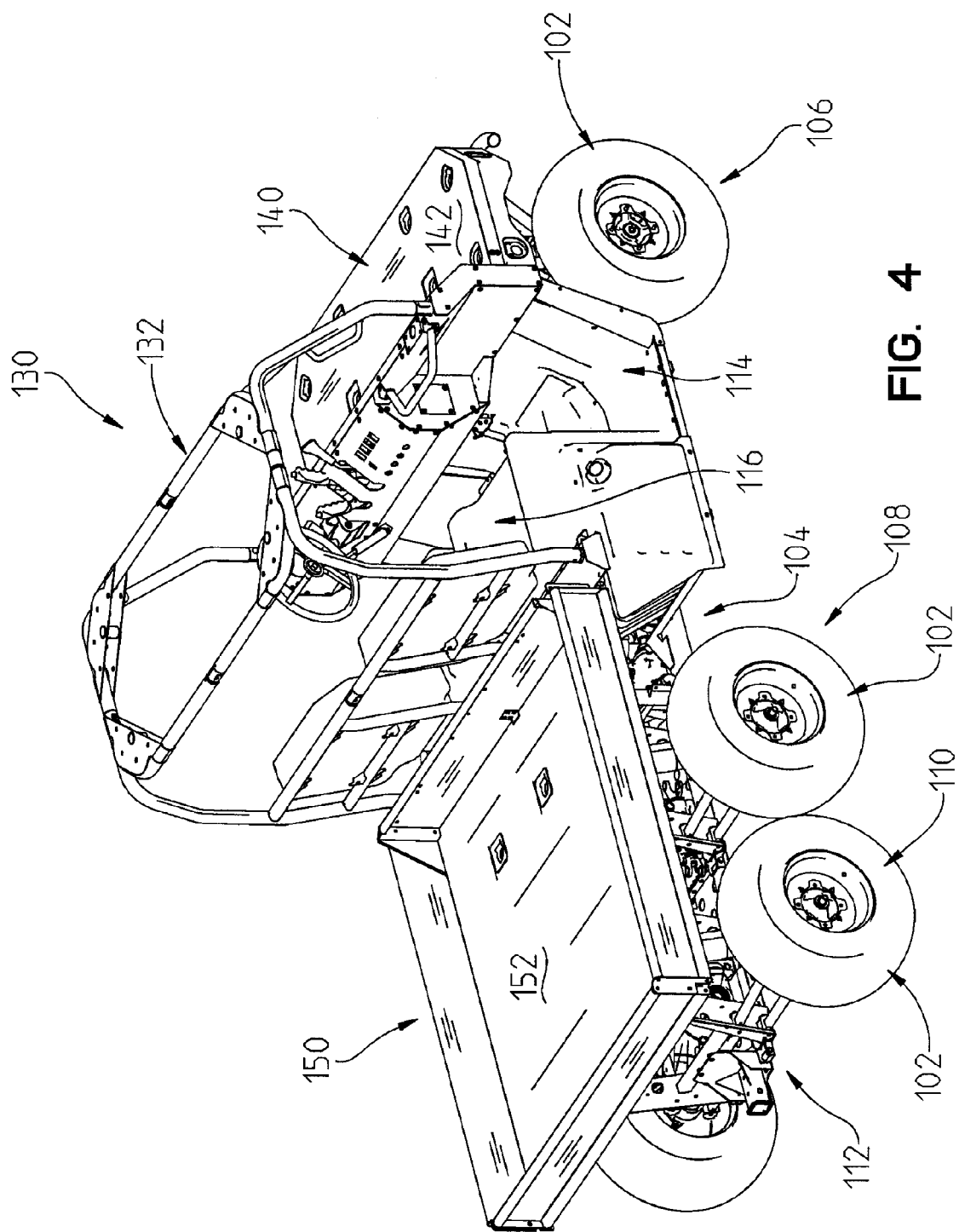
FIG. 4 is a rear, perspective view of the vehicle of FIG. 1 from a second side of the vehicle.
Figure 5:
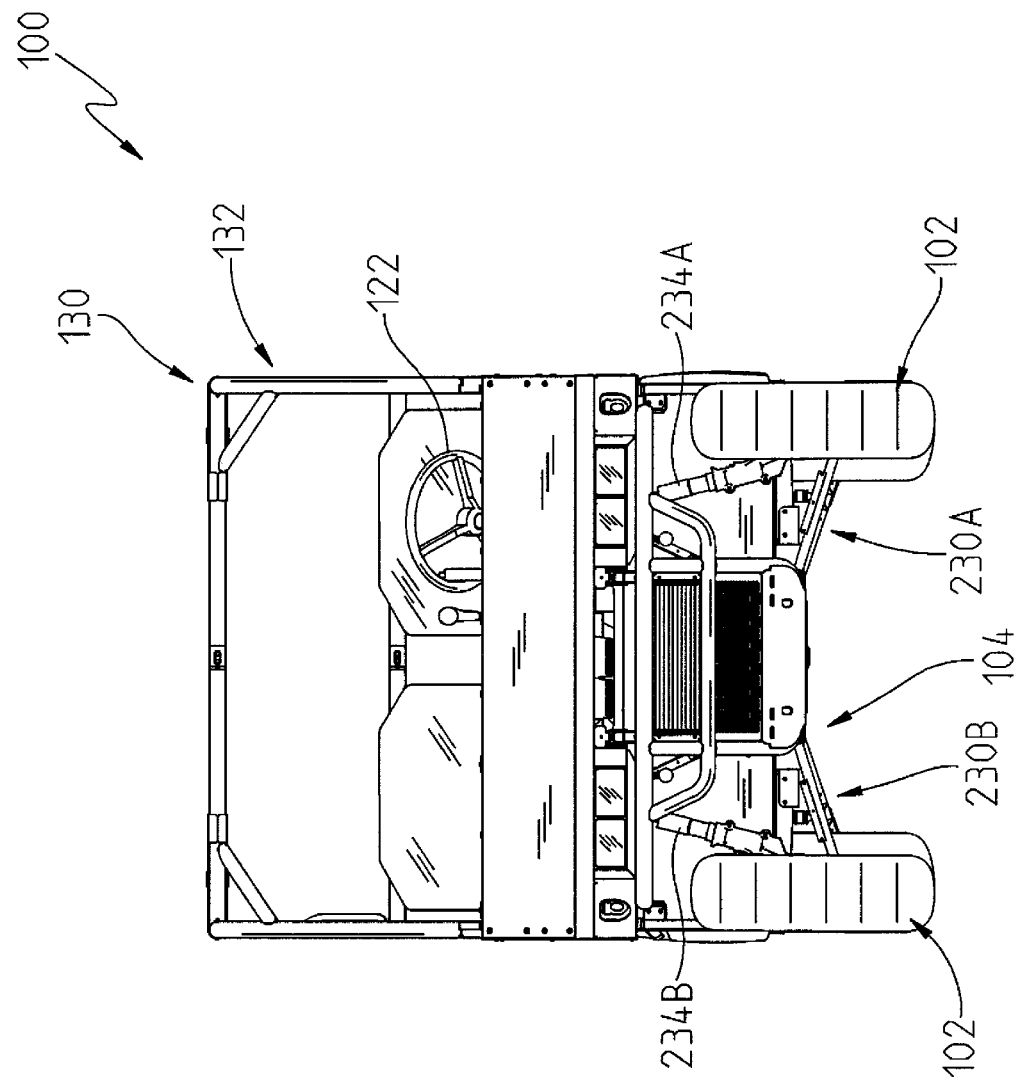
FIG. 5 is a front view of the vehicle of FIG. 1.

Referring to FIG. 1, an illustrative embodiment of a vehicle 100 is shown. Vehicle 100 as illustrated includes a plurality of ground engaging members 102, illustratively wheels. A first set of wheels, one on each side of vehicle 100, generally correspond to a front axle 106. A second set of wheels, one on each side of vehicle 100, generally correspond to a middle axle 108. A third set of wheels, one on each side of vehicle 100, generally correspond to a rear axle 110.

In one embodiment, one or more of the wheels may be replaced with tracks, such as the Prospector II Tracks available from Polaris Industries, Inc. located at 2100 Highway 55 in Medina, Minn. 55340. In one embodiment, a track is placed around the tires of the wheels middle axle 108 and rear axle 110 on each side of vehicle 100.

Figure 8A:
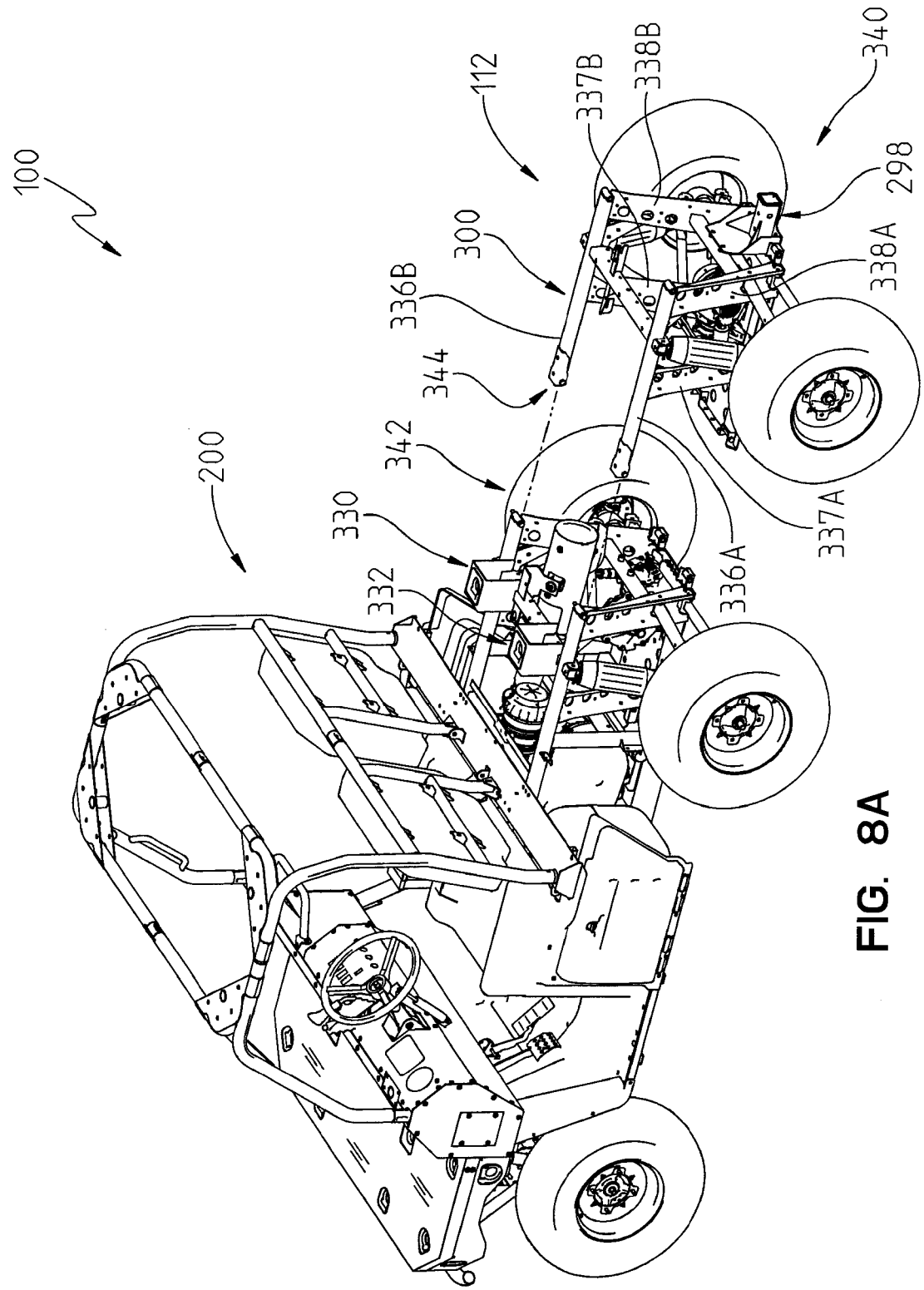
FIG. 8A is a perspective view of the vehicle of FIG. 1 illustrating a base portion comprising a 4×4 and a modular sub-section spaced apart therefrom.
Figure 8B:
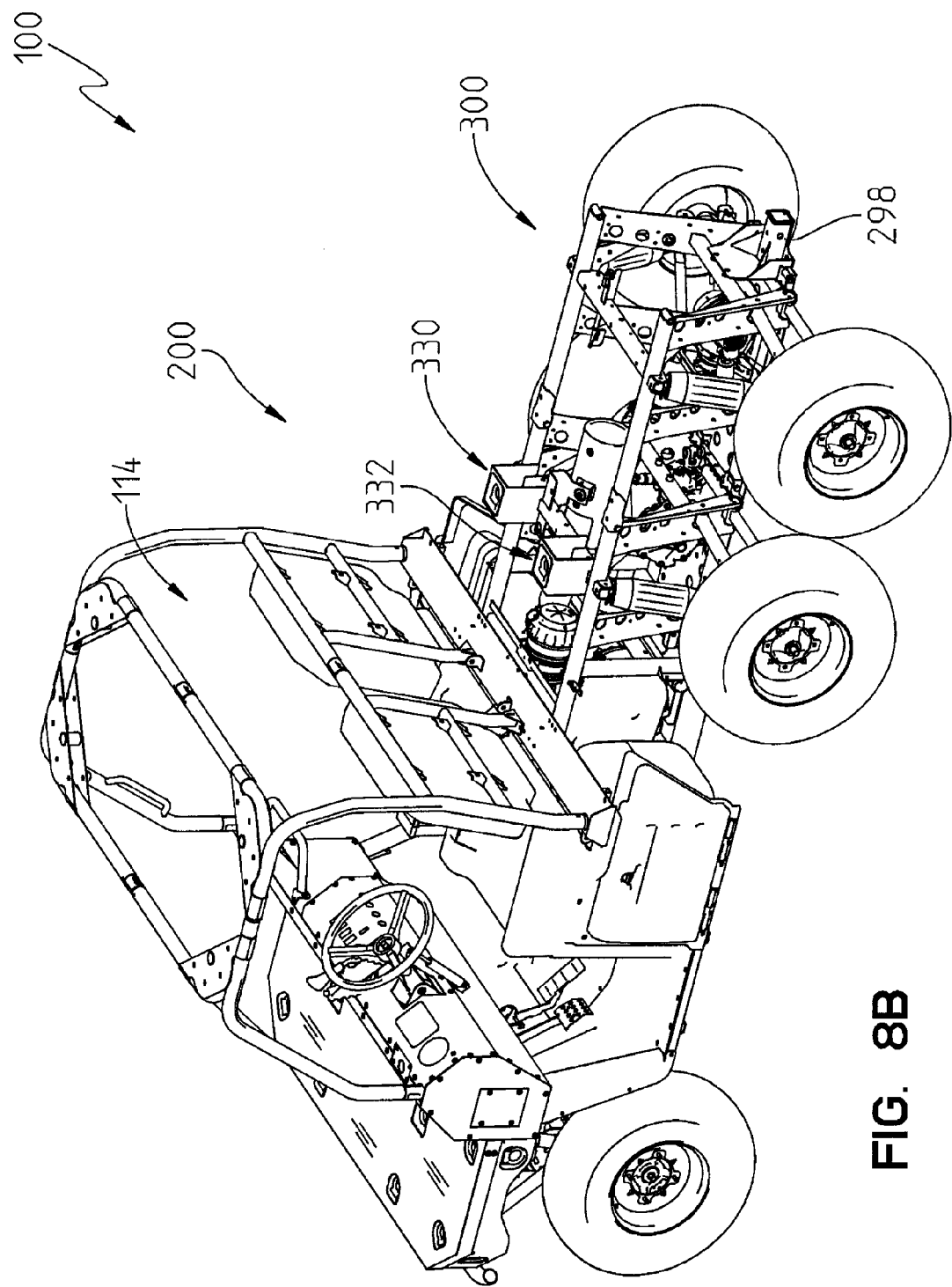
FIG. 8B is the view of FIG. 8A with the modular sub-section coupled to the base portion resulting in a 6×6 vehicle.

Vehicle 100 further includes a frame 104 supported by the plurality of ground engaging members 102. Referring to FIGS. 8A and 8B, vehicle 100 includes a base portion 200 and a modular subsection 112 including rear axle 110. Modular subsection 112 may be removed from the remainder of vehicle 100 to convert vehicle 100 from a six-wheeled vehicle to a four-wheeled vehicle. Further, additional modular subsections 112 may be added to vehicle 100 to convert vehicle 100 from a six-wheeled vehicle to an eight-wheeled vehicle or more. Additional details regarding base portion 200 and modular subsection 112 are provided in U.S. Provisional Application Ser. No. 60/918,502, filed Mar. 16, 2007, titled "VEHICLE".

Vehicle 100 includes an operator area 114 which includes seating 116 for one or more passengers. Operator area 114 further includes a plurality of operator controls 120 by which an operator may provide input into the control of vehicle 100. Controls 120 include a steering wheel 122 which is rotated by the operator to change the orientation of one or more of ground engaging members 102, such as the wheels associated with front axle 106, to steer vehicle 100.

Controls 120 also include a first foot pedal 124 actuatable by the operator to control the acceleration and speed of vehicle 100 through the control of an engine described in more detail in U.S. Provisional Application Ser. No. 60/918,502, filed Mar. 16, 2007, titled "VEHICLE", and a second foot pedal 126 actuatable by the operator to decelerate vehicle 100 through a braking system described in more detail in U.S. Provisional Application Ser. No. 60/918,502, filed Mar. 16, 2007, titled "VEHICLE". Additional details regarding the operator area 114, including controls 120, are provided in U.S. Provisional Application Ser. No. 60/918,556, filed Mar. 16, 2007, titled "VEHICLE", and U.S. Provisional Application Ser. No. 60/918,444, filed Mar. 16, 2007, titled "VEHICLE WITH SPACE UTILIZATION".

Frame 104 includes a portion 130 extending above operator area 114. Portion 130 is provided to protect the occupants of operator area 114 if vehicle 100 tips or rolls over. In the illustrated embodiment, portion 130 is a roll cage 132. In one embodiment, portion 130 is moveable from a first position protecting operator area 114 to a second position which provides vehicle 100 with a smaller envelope than when portion 130 is in the first position. As explained in more detail herein, in one embodiment, portion 130 is collapsible to reduce an overall envelope of vehicle 100.

Vehicle 100 further includes a front platform 140 supported by frame 104 and a rear platform 150 supported by frame 104. Both front platform 140 and rear platform 150 are shown having a support surface 142 and 152, respectively. Support surfaces 142 and 152 may be flat, contoured, and/or comprised of several sections. In addition one or both of front platform 140 and rear platform 150 may include upstanding walls to define a cargo box extending over at least a portion of the respective platform 140 and 150.

Further, portions of front platform 140 and rear platform 150, along with portion 130 of frame 104 may include devices for attaching various types of assets to vehicle 100. Exemplary assets including cargo containers, seats, gun mounts, footrests, and other suitable assets. Additional details regarding front platform 140 and rear platform 150 are provided in U.S. Provisional Application Ser. No. 60/918,556, filed Mar. 16, 2007, titled "VEHICLE", U.S. Provisional Application Ser. No. 60/918,444, filed Mar. 16, 2007, titled "VEHICLE WITH SPACE UTILIZATION", and/or U.S. Provisional Application Ser. No. 60/918,356, filed Mar. 16, 2007, titled "UTILITY VEHICLE HAVING MODULAR COMPONENTS".

Referring to FIG. 8A, vehicle 100 is shown having modular sub-section 112 spaced apart from base portion 200 of vehicle 100. In FIG. 8B, vehicle 100 is shown having modular sub-section 112 coupled to base portion 200. As explained in more detail in U.S. Provisional Application Ser. No. 60/918,502, filed Mar. 16, 2007, titled "VEHICLE", the base portion 200 of vehicle 100 includes all of the components required to operate vehicle 100. As such, an operator could remove modular sub-section 112 from the base portion 200 and still have an operational vehicle. Further, as explained in U.S. Provisional Application Ser. No. 60/918,502, filed Mar. 16, 2007, titled "VEHICLE", modular sub-section 112 may be quickly added to or removed from base portion 200.

Vehicle 100, whether simply base portion 200 or base portion 200 along with one modular subsections 112, is configured to be lifted off of the ground and carried through the air and to be dropped from a flying object, such as a transport plane, and parachute to the ground.

Figure 9:
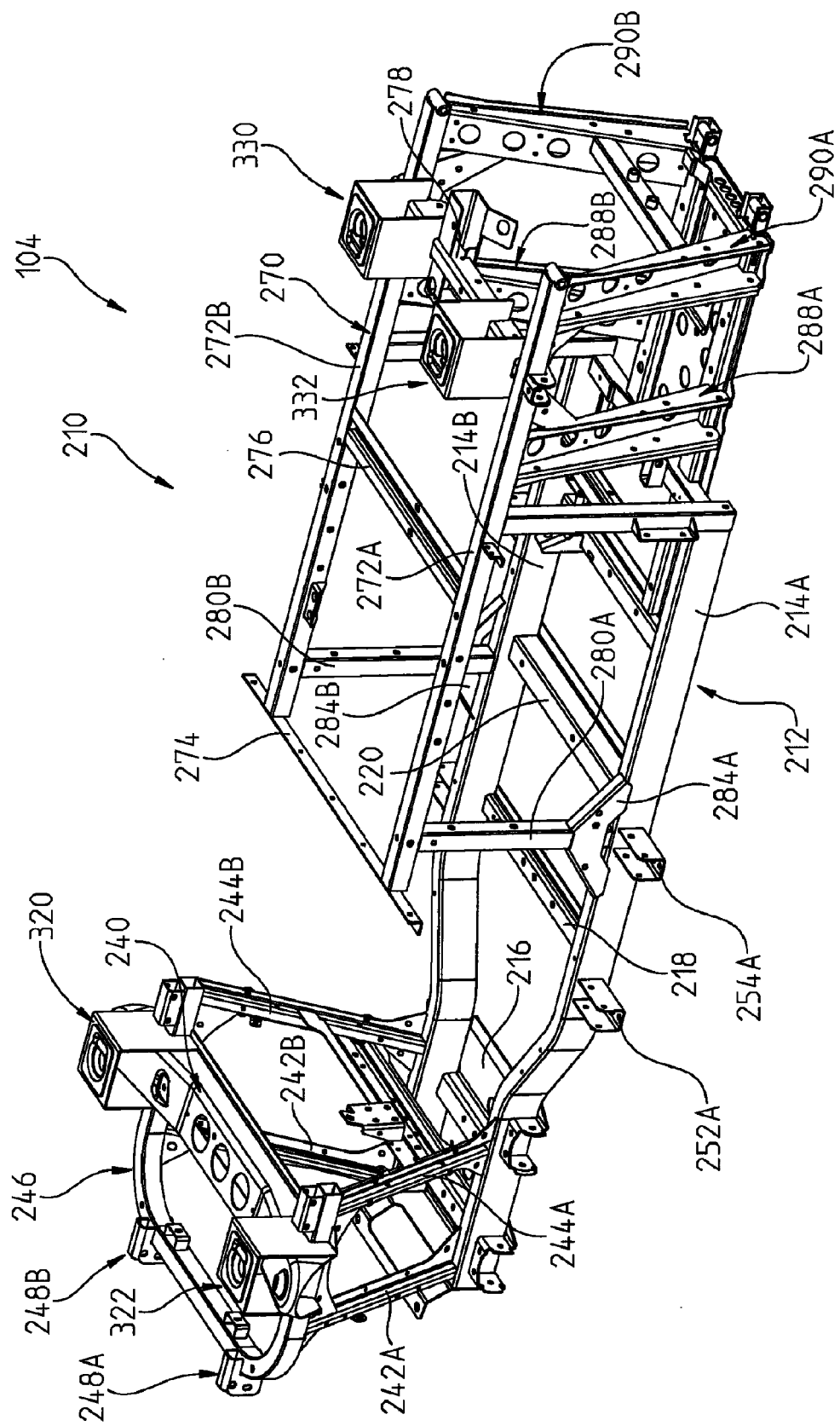
FIG. 9 is a rear perspective view of a base frame of the base portion of FIG. 8A.

Referring to FIG. 9, a base frame 210 of frame 104 is shown. Base frame 210 includes an upper frame member 240 that is supported by a lower frame 212 through a plurality of upwardly-extending frame members 242A, 242B, 244A, and 244B and a generally U-shaped frame member 246.

Lower frame 212 includes frame members 214A and 214B which include attachment locations 252 and 254 (252A and 254A shown in FIG. 9) to which an operator cab frame 260 (see FIG. 1) is attached. Operator cab frame 260 includes portion 130 of frame 104. In one embodiment, roll cage 132 of portion 130 is a generally fixed roll cage. In one embodiment, roll cage 132 of portion 130 is a collapsible roll cage.

Base frame 210 further includes a rear upper frame 270 including a first longitudinal frame member 272A and a second longitudinal frame member 272B. Longitudinal frame members 272A and 272B support rear platform 150.

Referring to FIG. 8A, modular sub-section 112 includes a modular frame assembly 300. As explained in more detail in U.S. Provisional Application Ser. No. 60/918,502, filed Mar. 16, 2007, titled "VEHICLE", rear portion 340 of modular sub-section 112 is generally identical to a rear portion 342 of base frame 210. Further, a front portion 344 of modular sub-section is configured to be coupled to rear portion 342 of base frame 210. Since rear portion 340 is generally identical to rear portion 342, a second modular sub-section 112 may be assembled to rear portion 340 of the first modular sub-section. Still further a third modular sub-section 112 may be assembled to rear portion 340 of the second modular sub-section and so forth thereby creating an 8×8 vehicle, a 10×10 vehicle, and so forth.

Although the above discussion is related to the assembly of modular frame assembly 300 to base frame 210, it should be understood that it is contemplated to couple a complete modular subsection 112 to a complete base portion 200. In one embodiment, a complete modular section 112 may be added or removed to base portion 200 through four frame connections. In one embodiment (see FIG. 6), each of base portion 200 and modular subsection 112 include a platform, illustratively platforms 150 and 190. Additional details regarding exemplary rear platforms are provided in U.S. Provisional Application Ser. No. 60/918,356, filed Mar. 16, 2007, titled "UTILITY VEHICLE HAVING MODULAR COMPONENTS".

Figure 10:
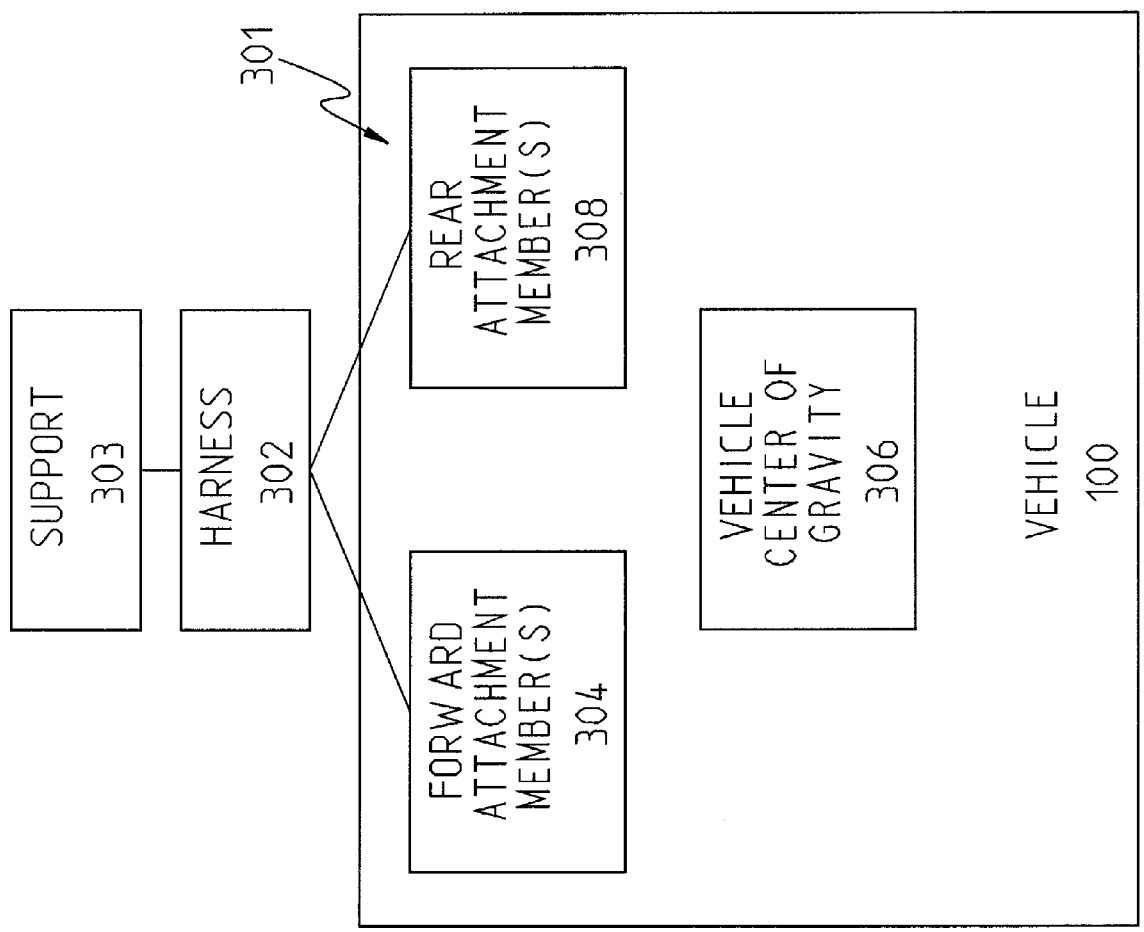
FIG. 10 is a diagrammatic view of the vehicle of FIG. 1 coupled to a support through a harness illustrating the relative placement of one or more front attachment members, one or more rear attachment members, and a center of gravity of the vehicle.

Referring to FIG. 10, vehicle 100 includes a plurality of attachment members 301 to which a harness 302, such as a cable or parachute may be attached to support vehicle 100 when vehicle 100 is spaced apart from the ground. Harness 302 is coupled to a support 303. Exemplary supports include a helicopter if vehicle 100 is being picked up off of the ground and one or more parachutes if vehicle 100 is being dropped from an airplane. The plurality of attachment members 301 includes one or more forward attachment members 304 positioned forward of a center of gravity of vehicle 100 and one or more rear attachment members 308 positioned rearward of center of gravity 306. In one embodiment as illustrated in FIG. 10, the plurality of attachment members are positioned above center of gravity 306 of vehicle 100.

In one embodiment, at least one of the attachment members 301 are coupled directly to frame 104 of vehicle 100. In one embodiment, each of the attachment members 301 are coupled directly to frame 104. In one embodiment, at least a first one of attachment members 301 is provided within a periphery of front platform 140 (see FIGS. 6 and 13) and at least a first one of attachment members 301 is provided within a periphery of rear platform 150 (see FIGS. 6 and 13). In one embodiment, at least a first one of the attachment members is provided outside of a periphery of front platform 140 (see FIG. 14) and a periphery of rear platform 150 (see FIG. 14).

Figure 6:
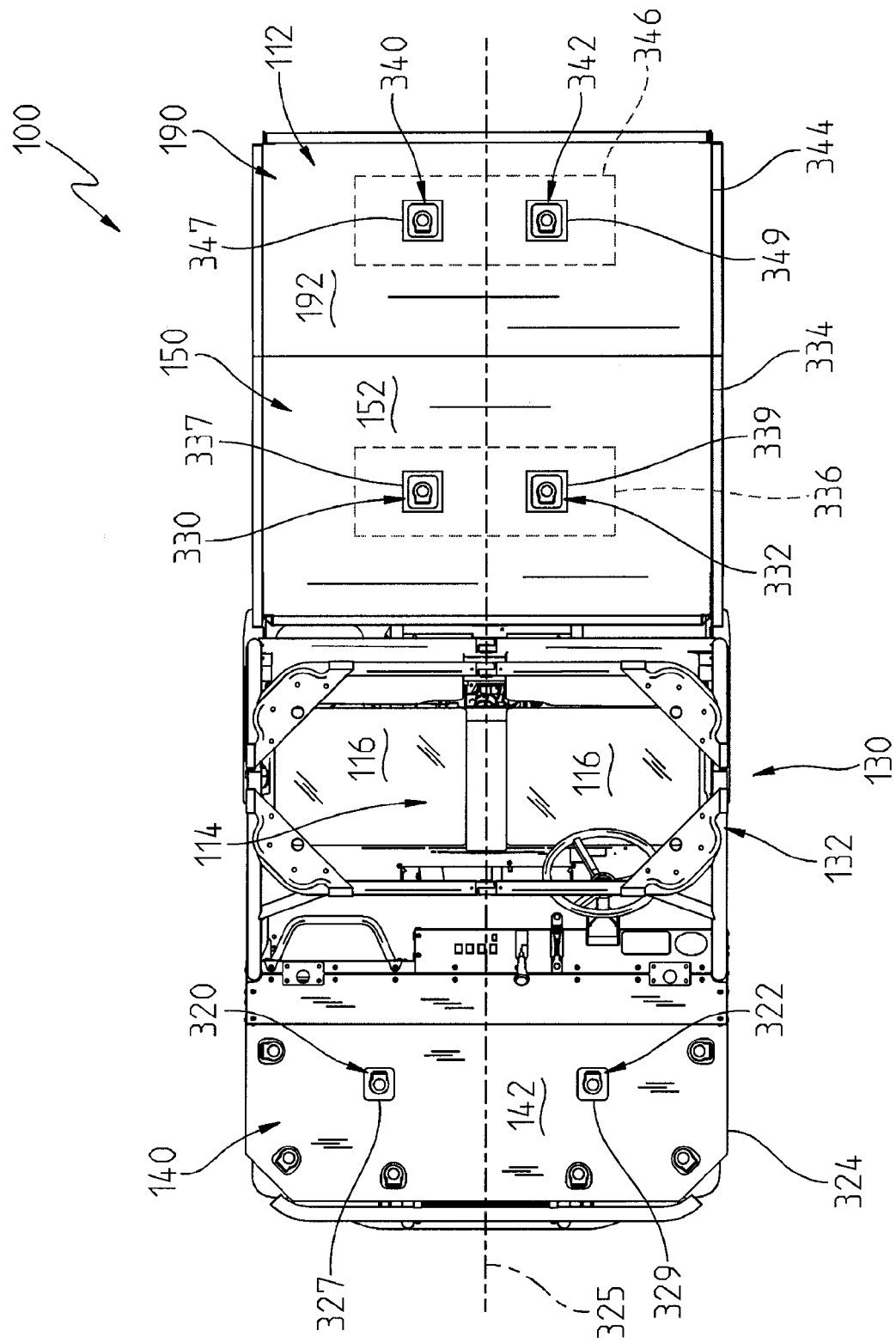
FIG. 6 is a top view of the vehicle of FIG. 1.
Figure 7:
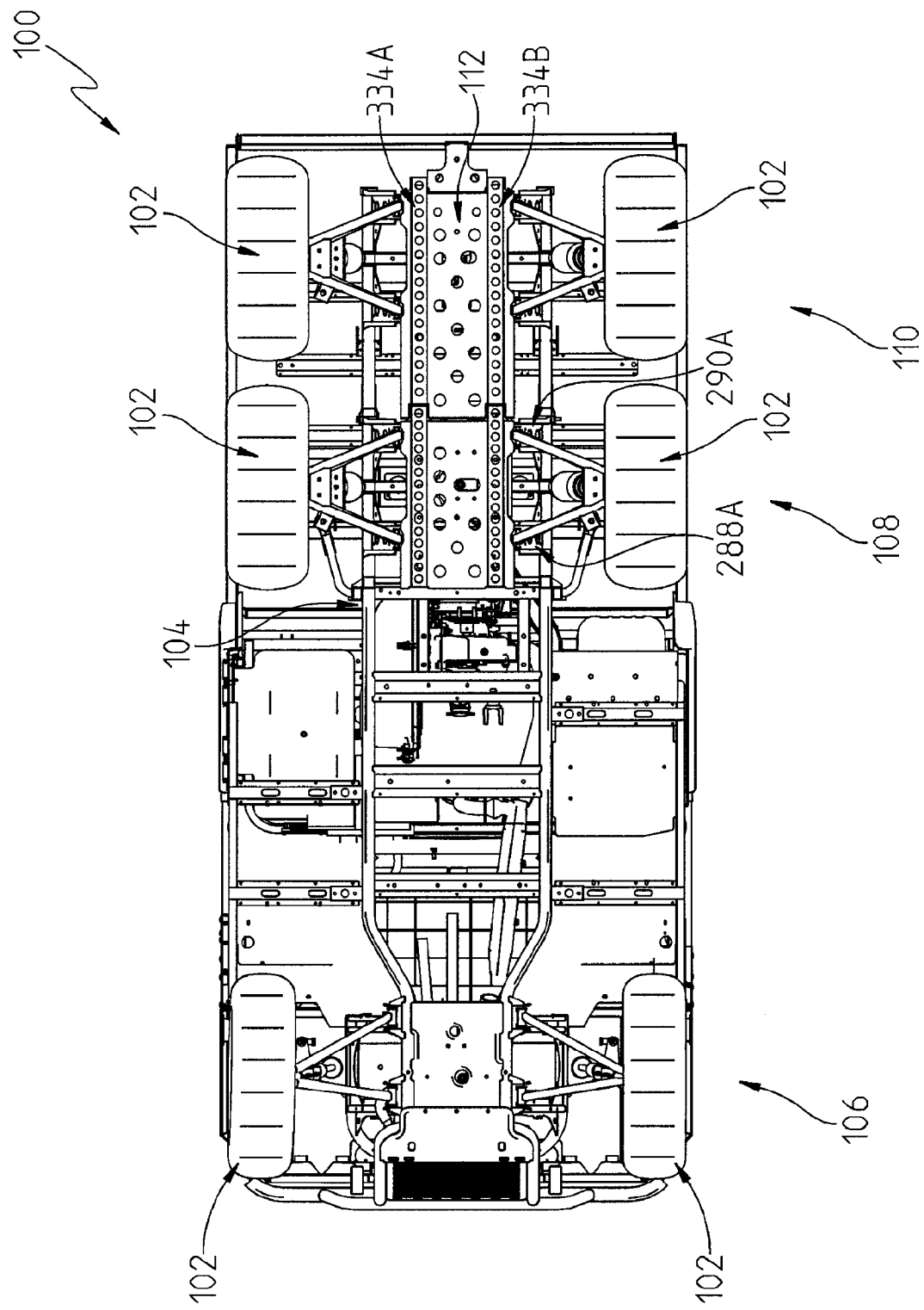
FIG. 7 is a bottom view of the vehicle FIG. 1.

Referring to FIG. 6, attachment members 320 and 322 are shown being within a periphery 324 of front platform 140. Attachment members 320 and 322 are forward attachment members 304. Periphery 324 corresponds generally to the outer extent of cargo carrying top surface 142. Attachment member 320 is positioned on a passenger side of a longitudinal centerline 325 of vehicle 100. Attachment member 322 is positioned on a driver side of longitudinal centerline 325 of vehicle 100. In one embodiment, the relative offset of attachment member 320 and attachment member 322 from centerline 325 is about equal.

In a similar fashion, attachment members 330 and 332 are shown being within a periphery 334 of rear platform 150. It should be noted that in FIG. 6 vehicle 100 has a modular subsection 112 attached thereto having a platform 190 with a cargo carrying surface 192. Attachment members 330 and 332 are rear attachment members 308. Periphery 334 corresponds generally to the outer extent of cargo carrying top surface 152. Attachment member 330 is positioned on a passenger side of longitudinal centerline 325 of vehicle 100. Attachment member 332 is positioned on a driver side of longitudinal centerline 325 of vehicle 100. In one embodiment, the relative offset of attachment member 330 and attachment member 332 from centerline 325 is about equal. In one embodiment, the relative offset of attachment member 330 and attachment member 332 from centerline 325 is about equal and in line with attachment members 320 and 322.

As shown in FIG. 6, modular subsection 112 also includes attachment members 340 and 342 which are positioned within a periphery 344 of platform 190 of modular subsection 112. Attachment members 340 and 342 are rear attachment members 308. Periphery 344 corresponds generally to the outer extent of cargo carrying top surface 192. Attachment member 340 is positioned on a passenger side of longitudinal centerline 325 of vehicle 100. Attachment member 342 is positioned on a driver side of longitudinal centerline 325 of vehicle 100. In one embodiment, the relative offset of attachment member 340 and attachment member 342 from centerline 325 is about equal. In one embodiment, the relative offset of attachment member 340 and attachment member 342 from centerline 325 is about equal and in line with attachment members 330 and 332

Each of attachment members 320, 322, 330, 332, 340, and 342 include D-rings. The D-rings generally lay flat and generally parallel to the respective platform in a first position and are rotatable upward to a second position wherein harness 302 is attached.

Figure 11:
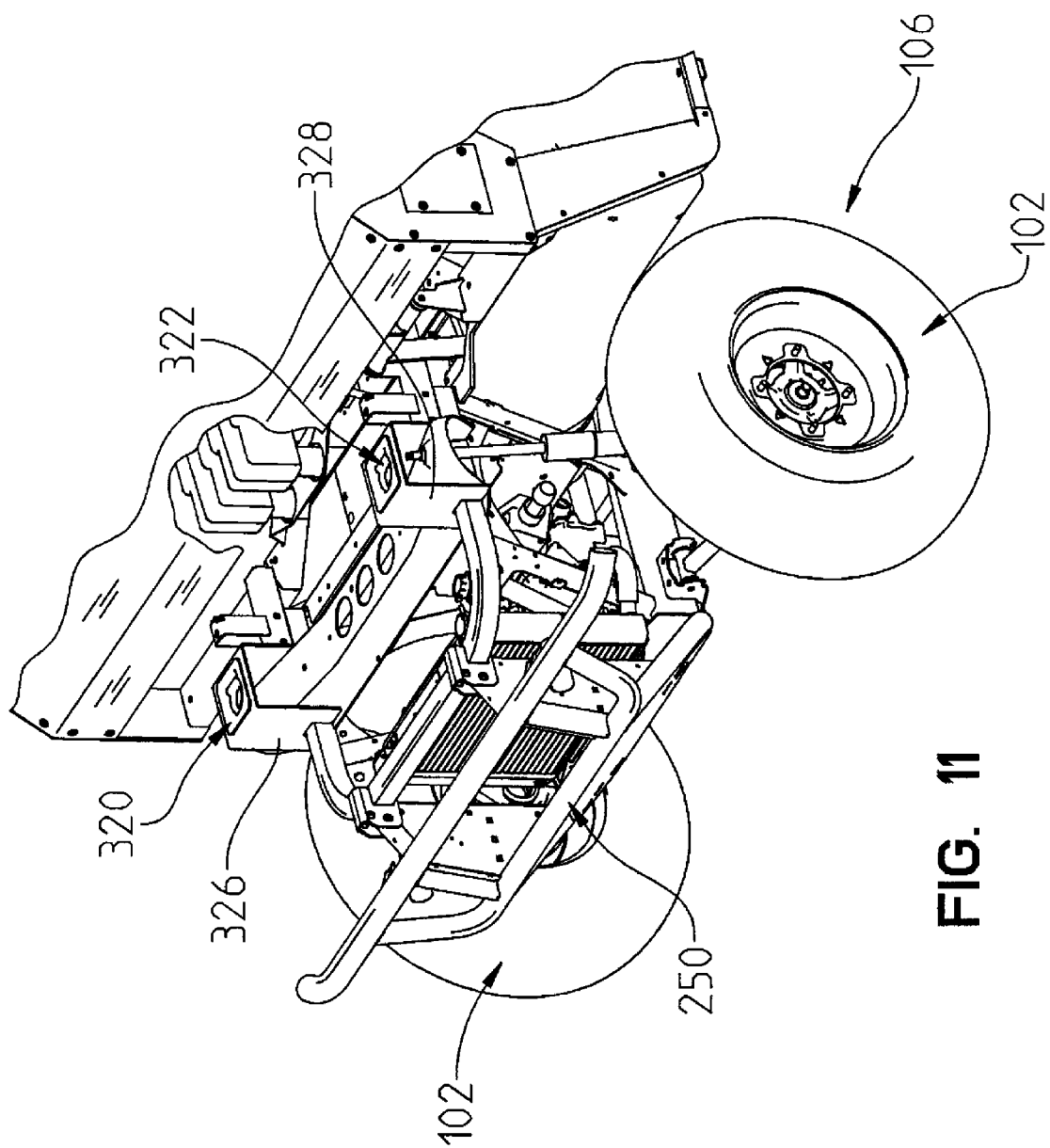
FIG. 11 is a partial front, perspective view of vehicle of FIG. 1 with the front platform removed.

Referring to FIG. 11, attachment members 320 and 322 are shown. In FIG. 11, vehicle 100 has front platform 140 removed. A base portion 326 and 328 of attachment members 320 and 322, respectively, are coupled to frame member 240. In one embodiment, base portions 326 and 328 are welded to frame member 240. In one embodiment, base portions 326 and 328 are bolted or otherwise secured to frame member 240.

Figure 12:
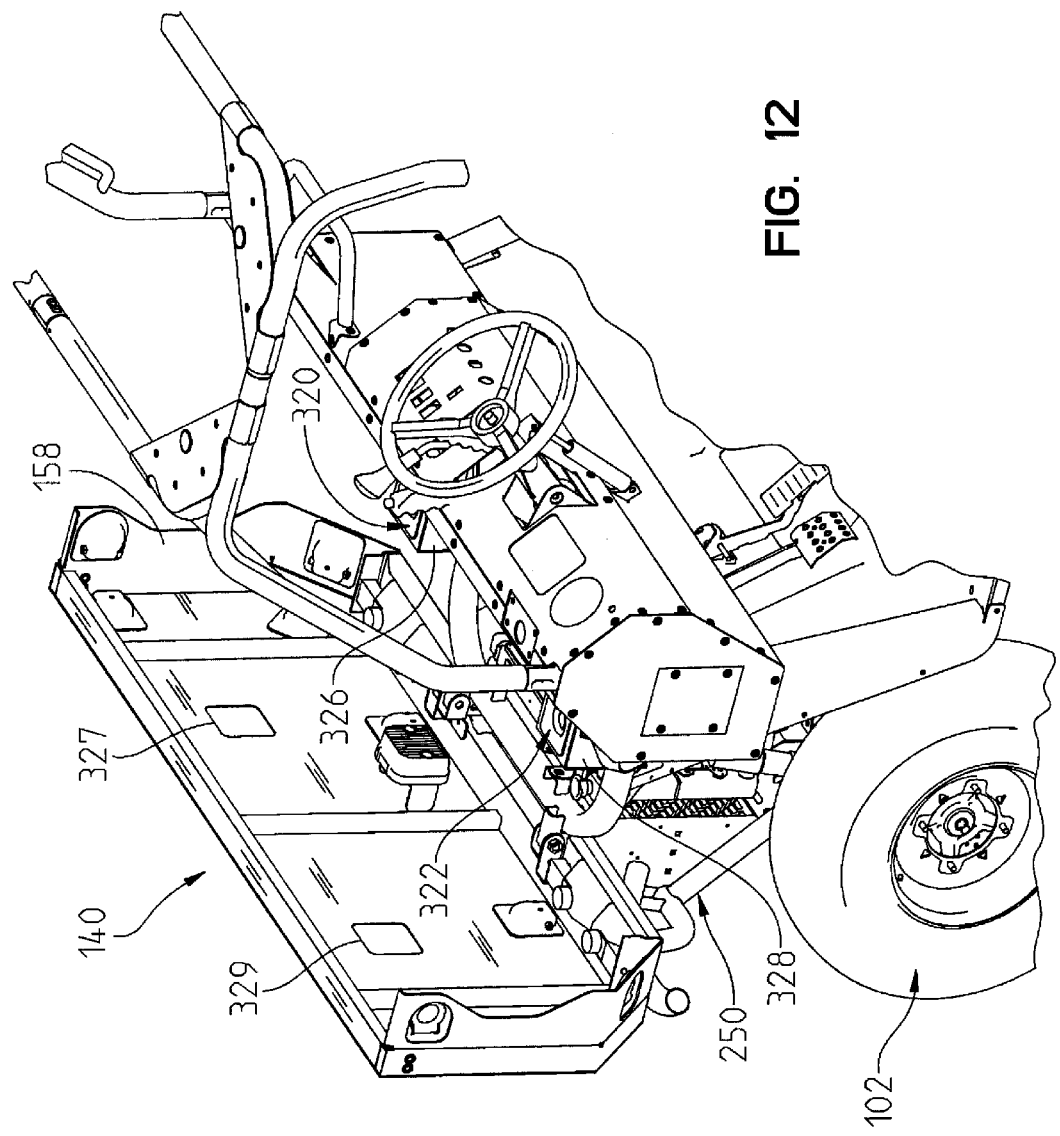
FIG. 12 is a partial perspective view of the vehicle of FIG. 1 with the front platform rotated upward.

Referring to FIG. 12, front platform 140 is shown in a raised position. Front platform 140 includes apertures 327 and 329 which are located to correspond to attachment member 320 and 322 when front platform 140 is in a lowered position, such as in FIG. 6. In this manner attachment members 320 and 322 may be positioned inboard of the periphery of front platform 140 and be accessible from above front platform 140 with front platform 140 in its lowered position.

Referring back to FIG. 6, attachment members 330 and 332 are shown. A base portion (not shown) of attachment members 330 and 332, respectively, are coupled to a frame member 336 (shown in phantom). Frame member 336 is a cross member which is apart of base frame 210. Frame member 336 may be one of cross members 276 and 278 (shown in FIG. 9) or be in addition to cross frame members 276 and 278. In one embodiment, frame member 336 is removed and the base portions of attachment members 332 and 330 are coupled to longitudinal members 272A and 272B, respectively.

Rear platform 150 includes apertures 337 and 339 which are located to correspond to attachment member 330 and 332. In this manner attachment members 330 and 332 may be positioned inboard of the periphery of rear platform 150 and be accessible from above rear platform 150.

In a similar manner, attachment members 340 and 342 of modular subsection 112 interact with modular subsection frame 300 and platform 190. A base portion (not shown) of attachment members 340 and 342, respectively, are coupled to a frame member 346. Frame member 346 is a cross member which is apart of modular subsection frame 300. In one embodiment, frame member 346 is removed and the base portions of attachment members 342 and 340 are coupled to longitudinal frame members of modular subsection frame 300.

Rear platform 190 includes apertures 347 and 349 which are located to correspond to attachment member 340 and 342. In this manner attachment members 340 and 342 may be positioned inboard of the periphery of rear platform 190 and be accessible from above rear platform 190.

Figure 13:
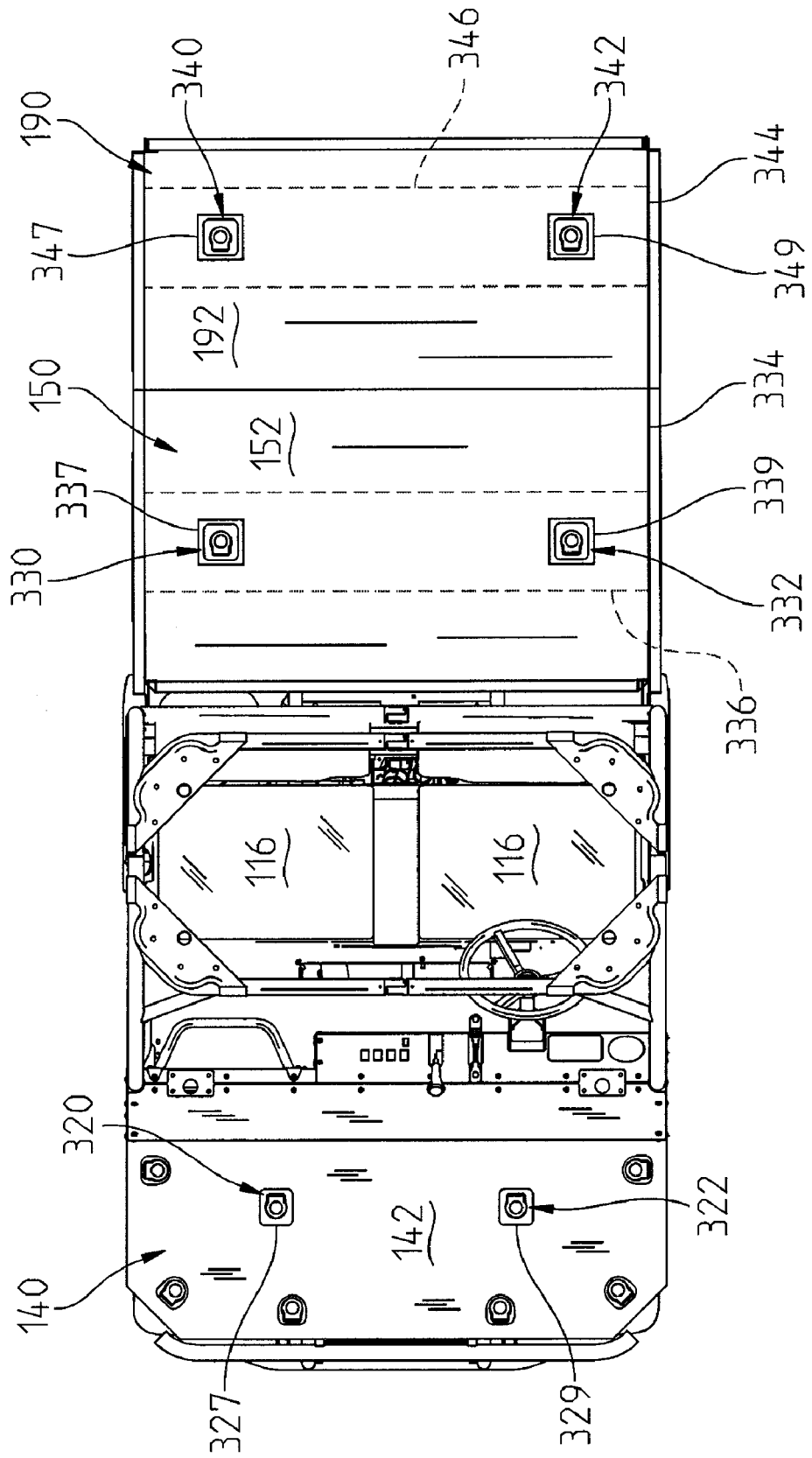
FIG. 13 is a top view of the vehicle of FIG. 1 illustrating a plurality of rear attachment members spaced further outward relative to their placement in FIG. 6 but still within a periphery of the rear platform.

Referring to FIG. 13, in one embodiment the locations of attachment members 320, 322, 330, 332, 340, and 342 may be moved from the locations illustrated in FIG. 6. By way of example, frame members 336 and 346 have been lengthened and attachment members 330, 332, 340, and 342 have been moved further outbound, but still within the respective peripheries 334 and 344 of platforms 150 and 190. Further, the number of attachment members may be adjusted to fewer or more than those shown.

Figure 13A:
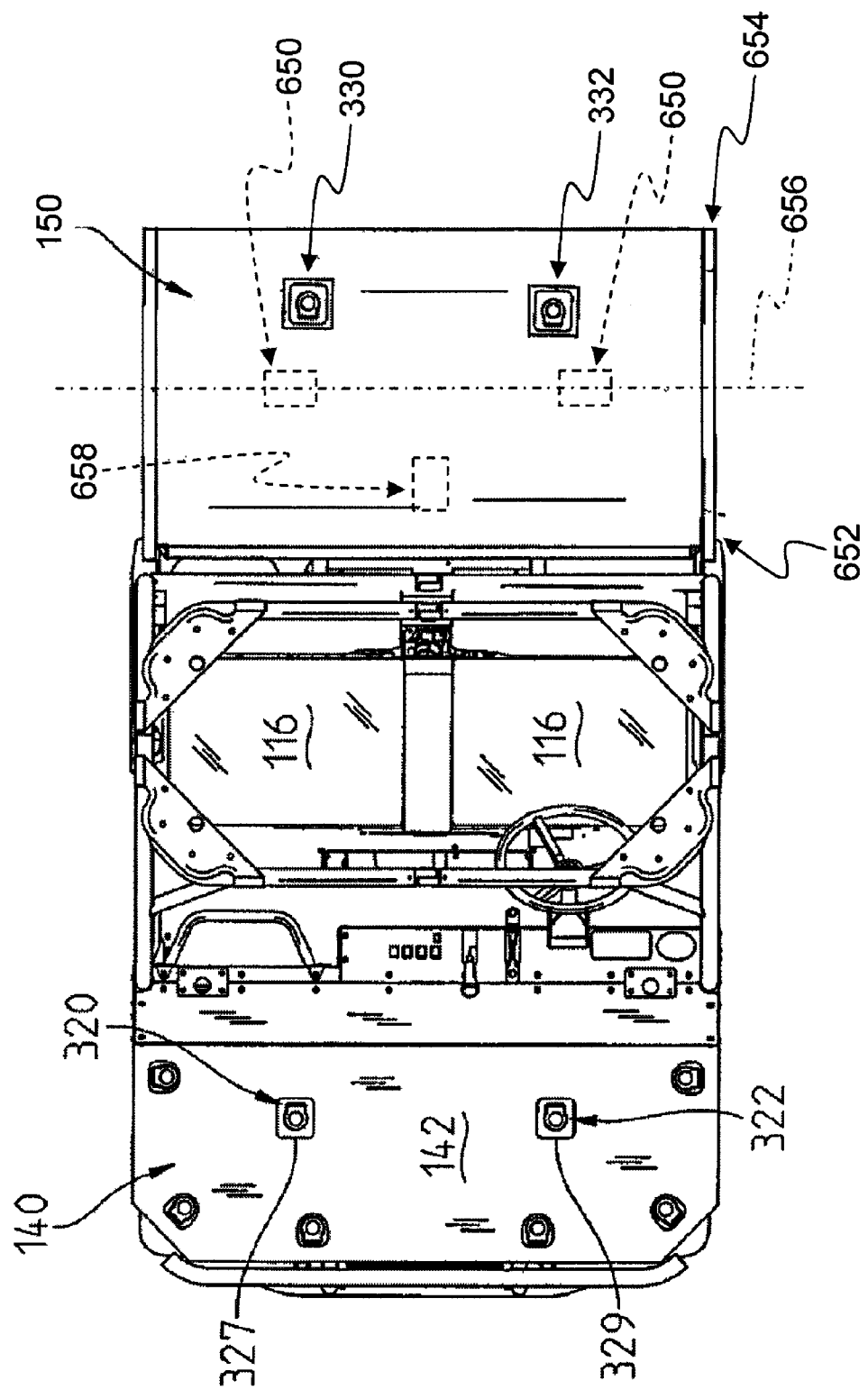
FIG. 13A is a top view of another embodiment of the vehicle.

Referring to FIG. 13A, in a further embodiment attachment members 330 and 332 are coupled to rear platform 150 instead of directly to frame 104. Rear platform 150 is rotatably coupled to frame 104 through one or more conventional brackets 650. Brackets 650 are coupled to frame 104 and rear platform 150 and permit a front portion 652 of platform 150 to be raised relative to a rear portion 654 of platform 150. Brackets 650 permit the rotation of platform 150 about axis 656 to permitting the dumping of cargo from platform 150. A conventional latch member 658 may be used to hold platform 150 in a generally horizontal position. The latch member 658 may be released to permit the rotation of platform 150 about axis 656. The rotation of platform 150 may be by manual force or through an actuator.

As shown in FIG. 13A, attachment members 330 and 332 are positioned rearward of axis 656. This positioning of attachment members 330 and 332 biases front portion 652 of platform 150 to remain generally horizontal when vehicle 100 is supported by support 303. This reduces the load exerted on latch member 658. As shown in FIG. 13A, attachment members 330 and 332 are positioned within the periphery of rear platform 150. In one embodiment, attachment members 330 and 332 are positioned outside of the periphery of rear platform 150. In one example, attachment members 330 and 332 are attached to a wall of rear platform 150.

Figure 14:
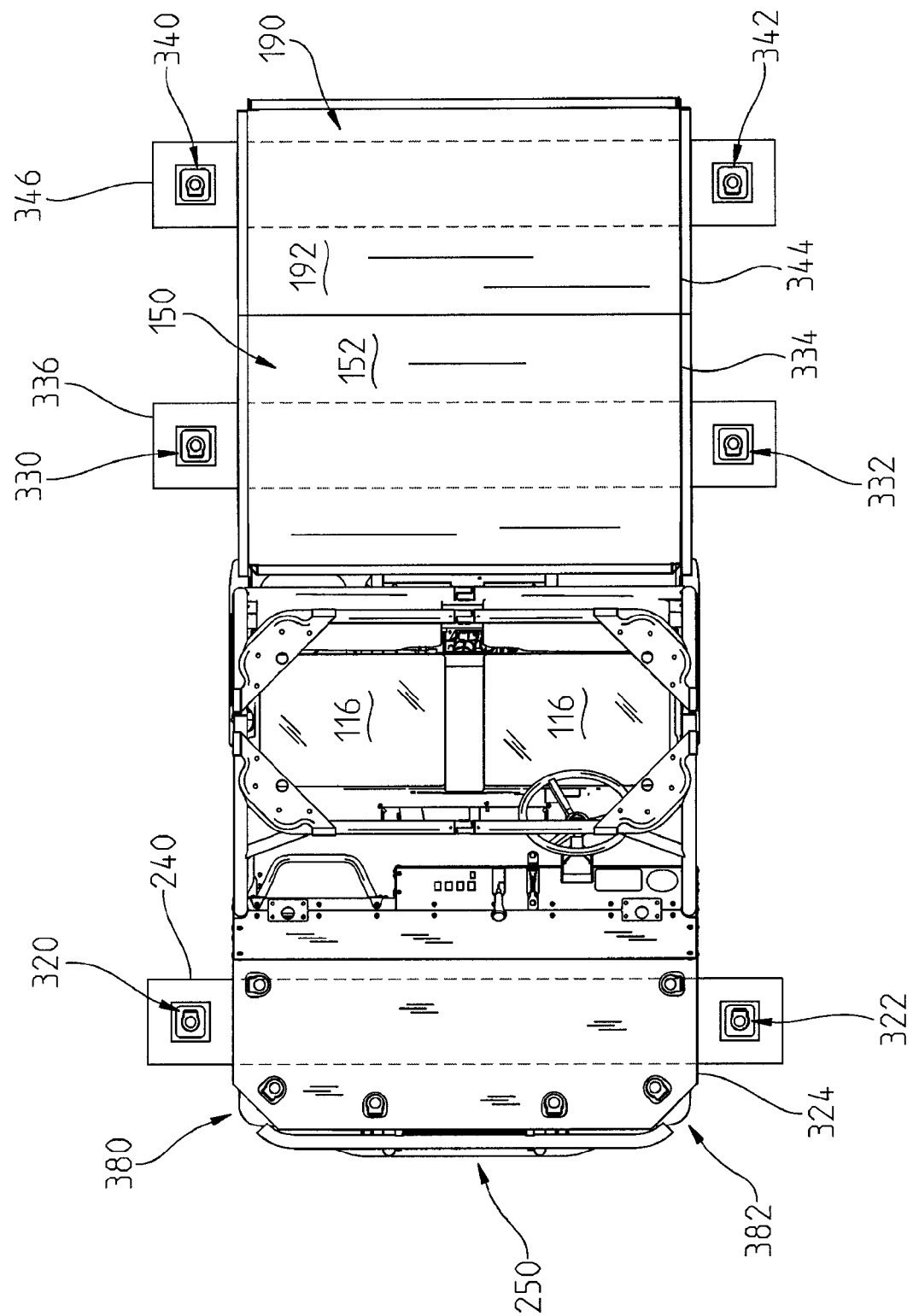
FIG. 14 is a top view of the vehicle of FIG. 1 illustrating a plurality of rear attachment members spaced further outward relative to their placement in FIG. 6 and outside of a periphery of the rear platform.

Referring to FIG. 14, in another embodiment, frame members 240, 336, and 346 have each been lengthened to extend beyond the respective peripheries 324, 334, 344, of platforms 140, 150, 190. Attachment members 320, 322, 330, 332, 340, and 342 are coupled to the respective frame members 240, 336, and 346 at locations outside of the respective peripheries 324, 334, 344, of platforms 140, 150, 190. In this manner, platforms 140, 150, and 190 may be loaded with cargo across the entire periphery of the respective platforms 140, 150, and 190 without interfering with the coupling of attachment members 320, 322, 330, 332, 340, and 342 to harness 302. As such, vehicle 100 may be completely loaded for a mission, attached to harness 302, and transported to a desired location.

In one embodiment, attachment members 320 and 322 are coupled to front corners 380 and 382 of vehicle 100, such as to bumper assembly 250.

Referring to FIG. 1, vehicle 100 may include a roll cage 132. Roll cage 132 is shown as being a fixed roll cage. Roll cage 132 protects the occupants of operator cab 114 in case of a rollover of vehicle 100, provides additional storage locations, such as on top of roll cage 132, and provides support for articles to protect the occupants of operator cab 114 from the elements, such as a windshield, doors, and other suitable accessories.

Figure 15A:
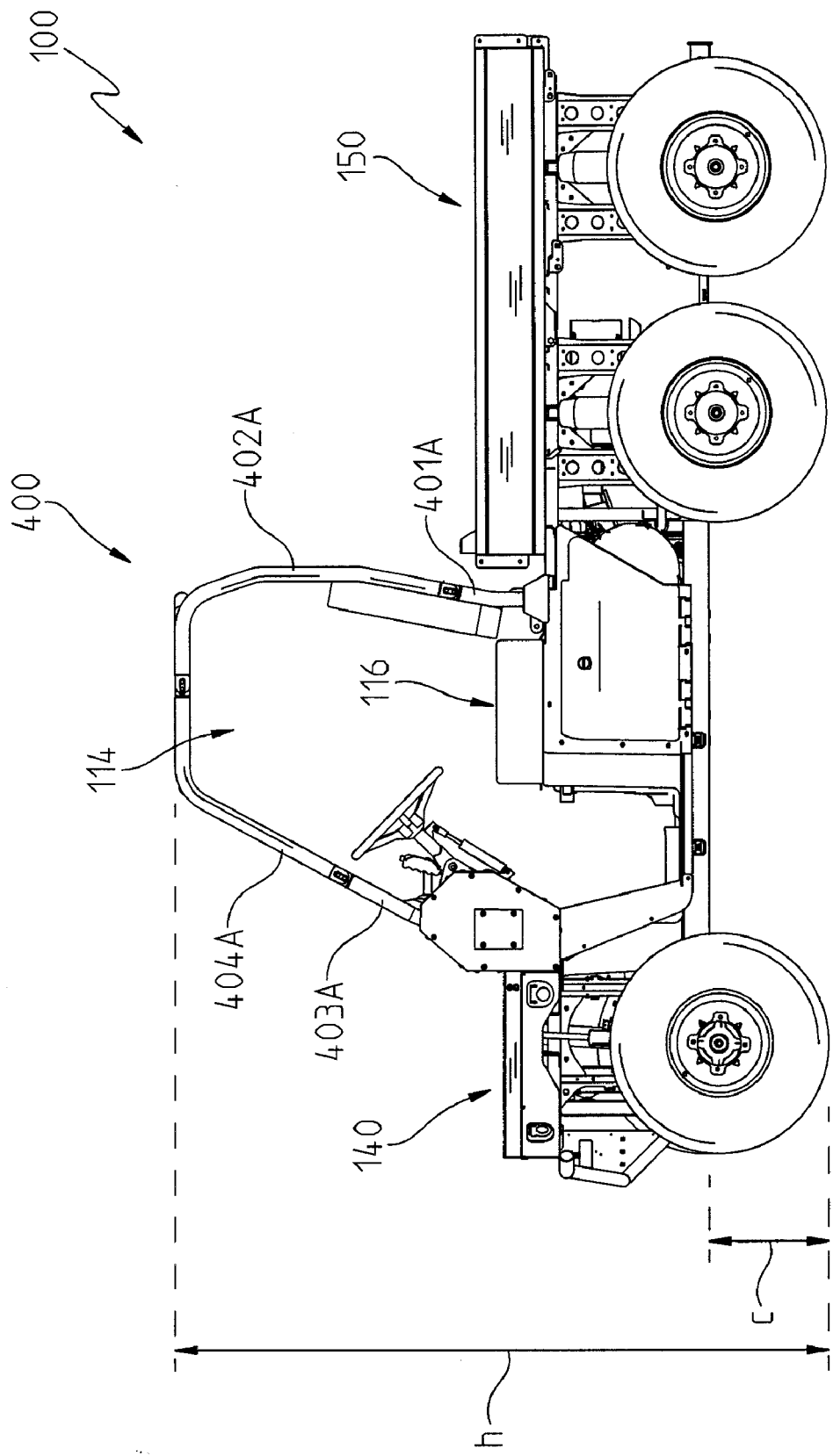
FIG. 15A is a side view of the first side of the vehicle of FIG. 1 including a first exemplary collapsible roll cage, the roll cage being in a raised configuration.
Figure 15B:
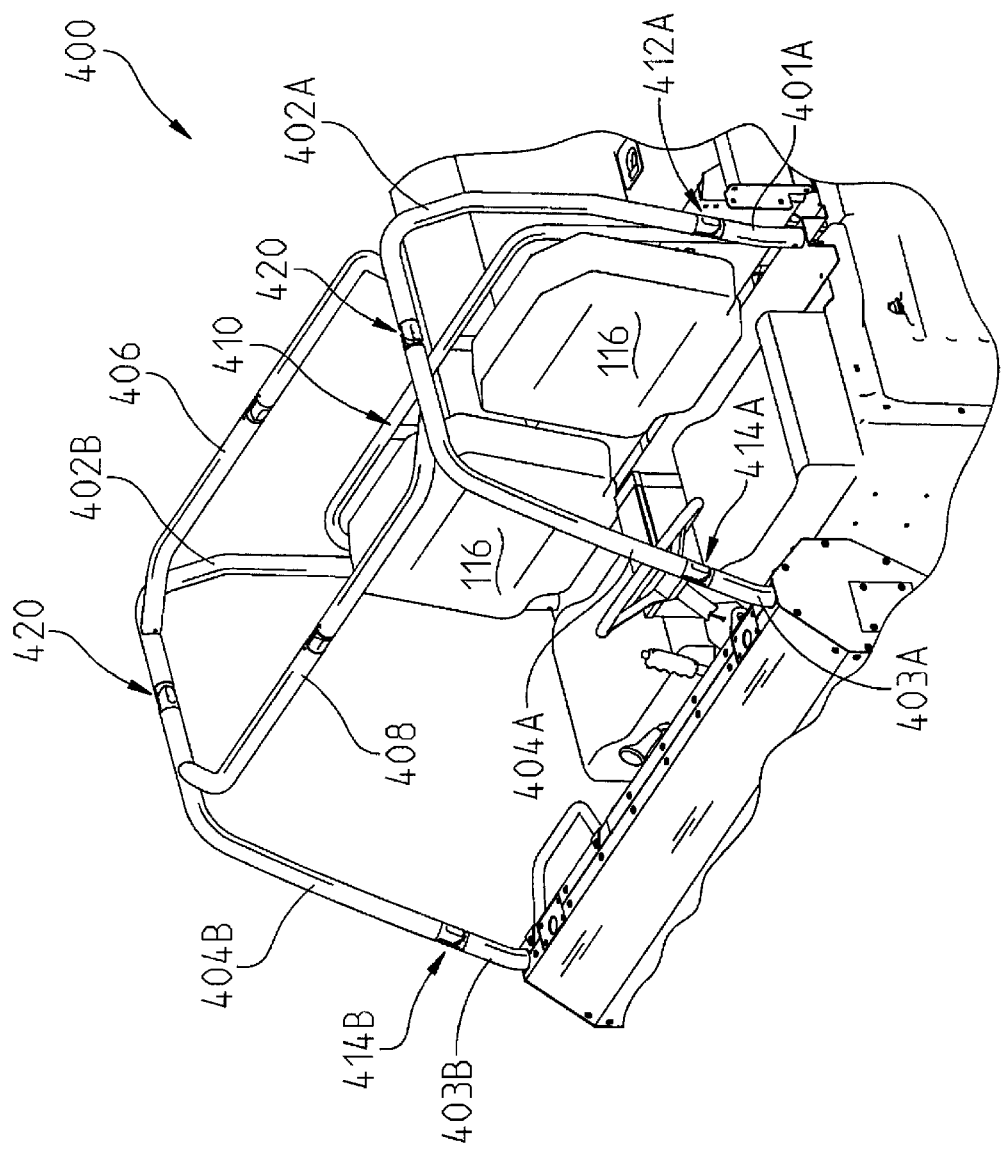
FIG. 15B is a view similar to FIG. 15A showing the roll cage in a raised configuration.

In one embodiment, a roll cage 400 is provided which is similar to roll cage 132 except that it is collapsible. Referring to FIGS. 15A and 15B, roll cage 400 is shown in a raised position. With roll cage 400 in the raised position of FIGS. 15A and 15B, vehicle 100 has an overall height "h" of about 75 inches. Vehicle 100 also has a ground clearance "c" of about at least 7 inches.

Referring to FIG. 15B, roll cage 400 includes a pair of rear, lower frame members 401A and 401B, a pair of rear, upper frame members 402A and 402B, a pair of front, lower frame members 403A and 403B, a pair of front, upper frame members 404A and 404B, a rear, cross frame member 406, and a front, cross frame member 408. Rear, lower frame members 401A and 401B are coupled to the base frame of the vehicle and rear, upper frame members 402A and 402B are rotatably coupled to rear, lower frame members 401A and 401B at hinge 412A and a similar hinge on the passenger side of vehicle 100. Front, lower frame members 403A and 403B are coupled to the base frame of the vehicle and rear, upper frame members 404A and 404B are rotatably coupled to front, lower frame members 403A and 403B at hinges 414A and 414B.

In one embodiment, hinges 412 and 414 include a lock member to lock the respective frame members in the position shown in FIG. 15B. In one embodiment, the lock member is a bolt received in aligned apertures of the respective frame members to lock the orientation of the respective upper frame member to the lower frame member. In one embodiment, the lock member is a quick release member. Additional exemplary lock members include pins and other suitable lock members.

Rear, upper frame members 402A and 402B are coupled to the respective front upper frame members 404A and 404B through couplers 420. In one embodiment, couplers 420 are bolts received in aligned apertures of the respective frame members. In one embodiment, couplers 420 are quick release members. Additional exemplary couplers include pins and other suitable couplers.

Figure 16A:
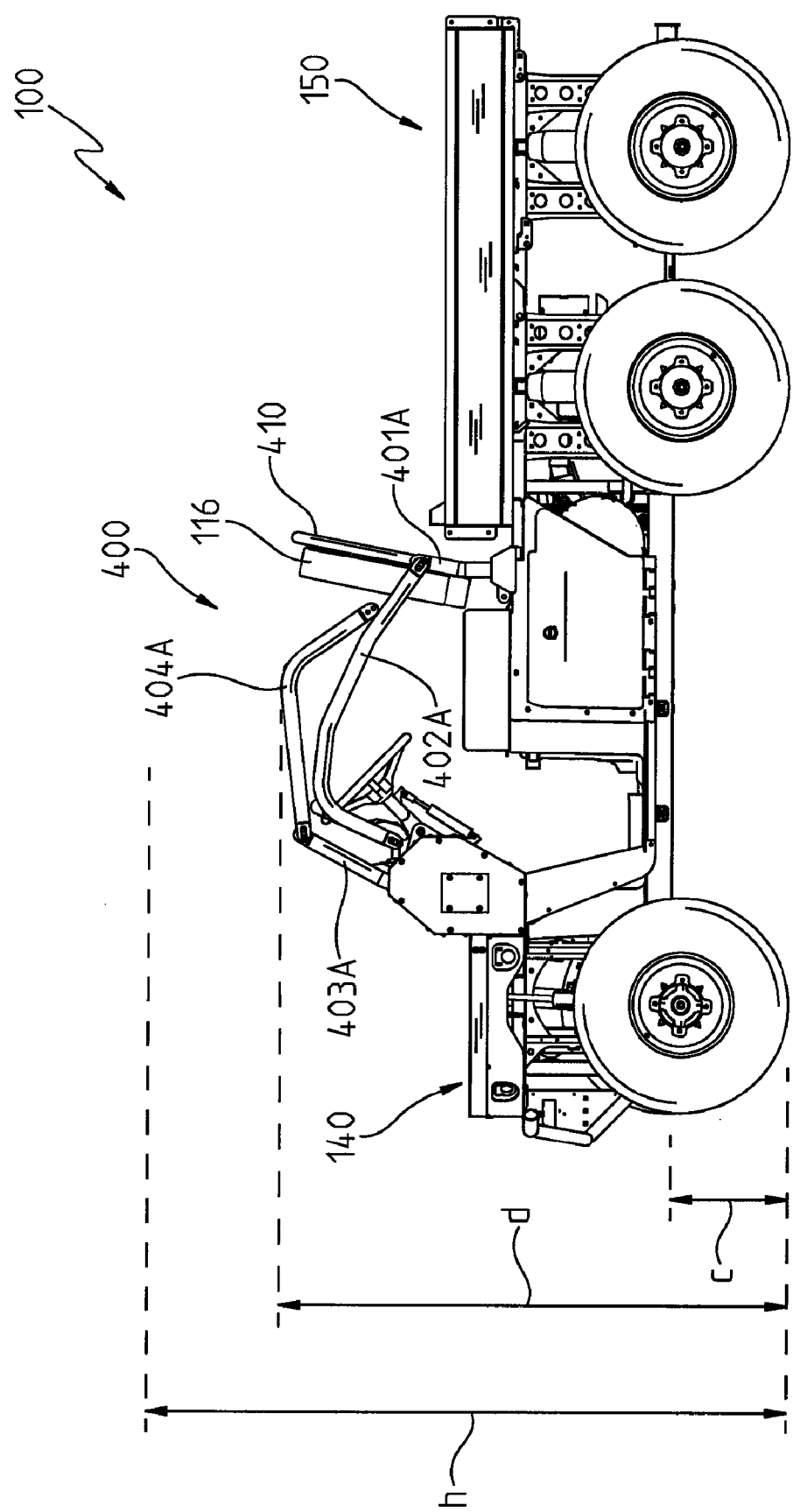
FIG. 16A is the side view of FIG. 15A with the roll cage being in a lowered configuration.
Figure 16B:
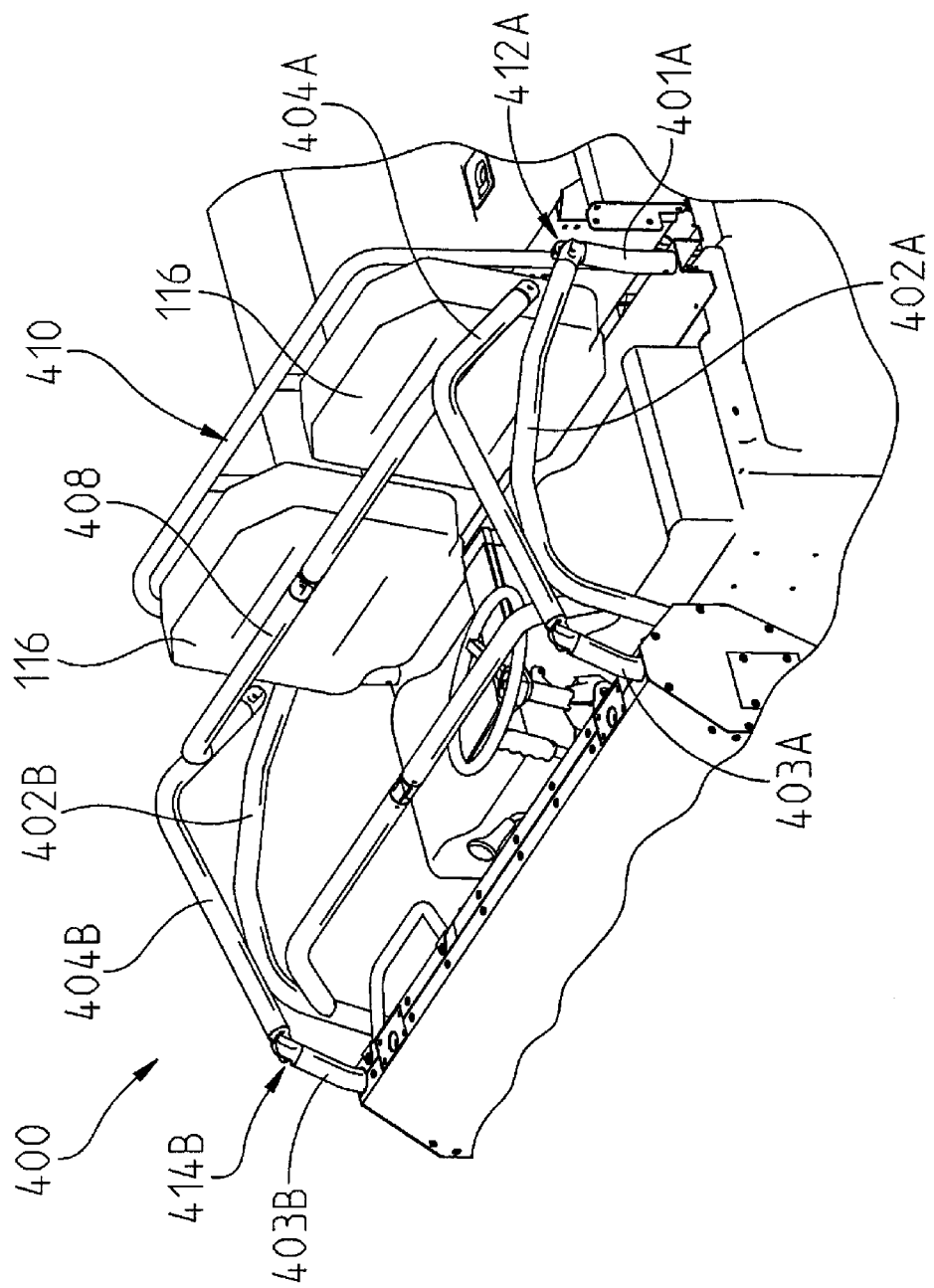
FIG. 16B is a view similar to FIG. 16A showing the roll cage in a lowered configuration.
Figure 17A:
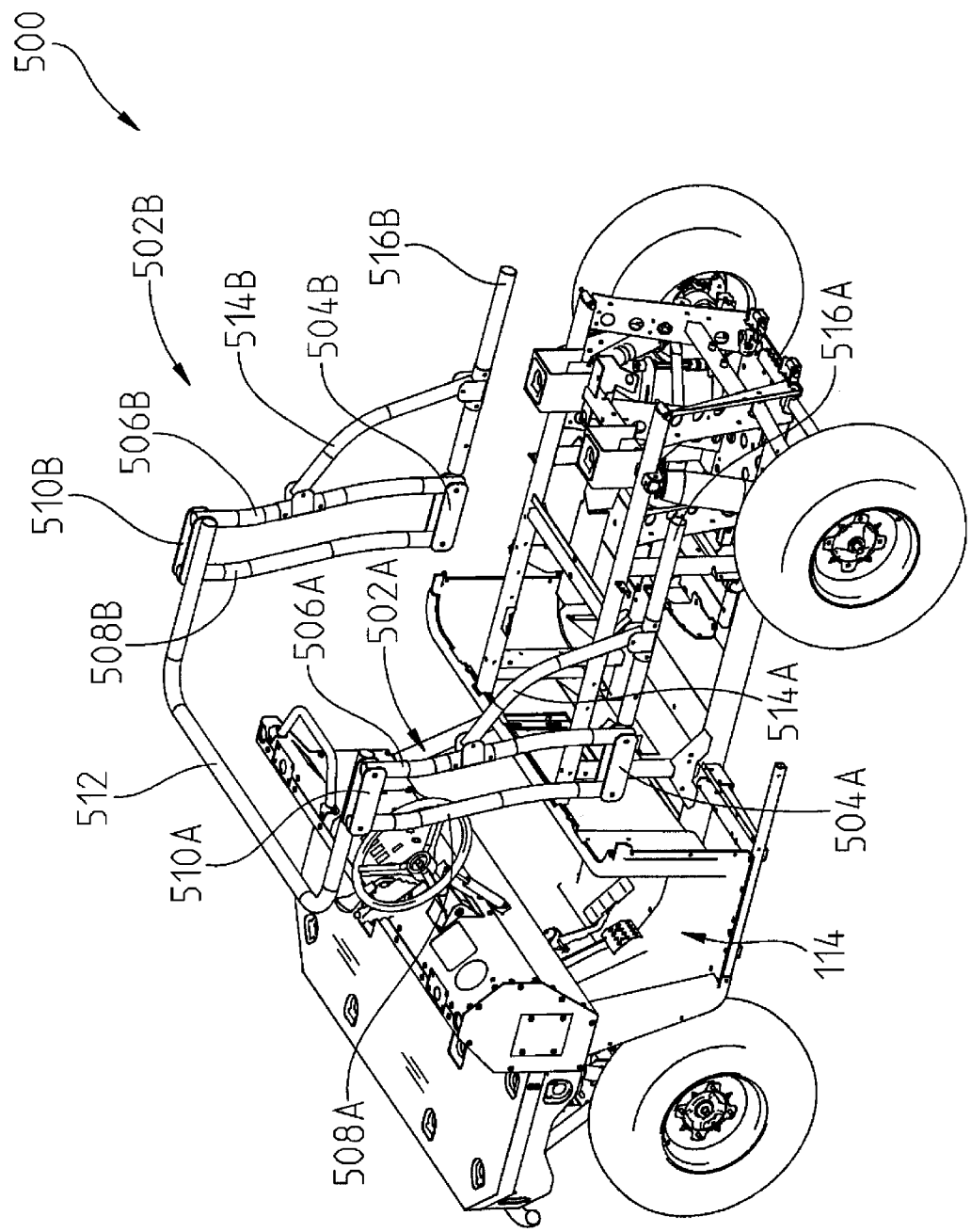
FIG. 17A is a front perspective view of a second exemplary collapsible roll cage, the roll cage being in a raised configuration.
Figure 17B:
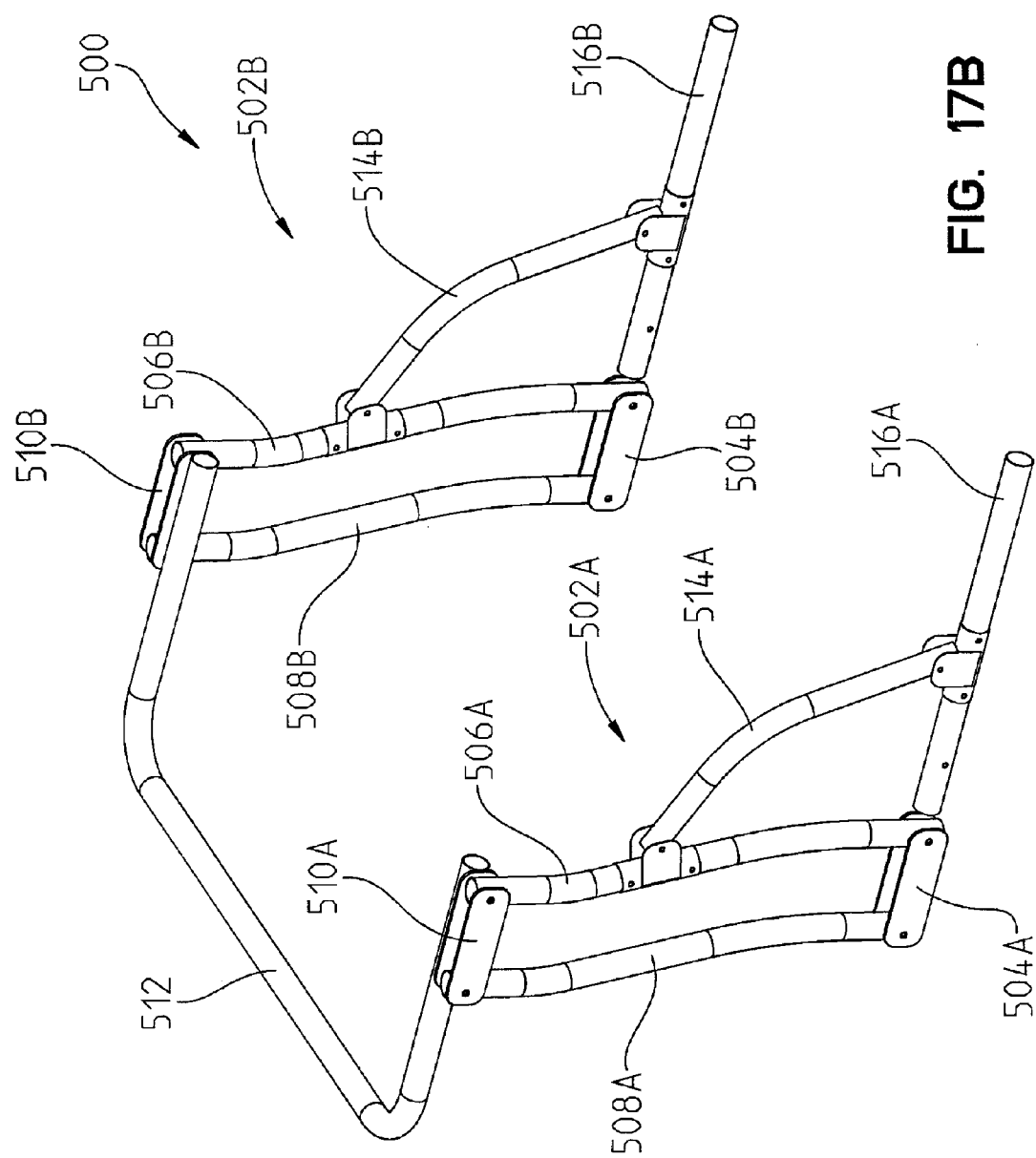
FIG. 17B is a front perspective view of a second exemplary collapsible roll cage, the roll cage being in a raised configuration.

Referring to FIGS. 16A and 16B, roll cage 400 is shown in a lowered position. In the lowered position, vehicle 100 has an overall height "d" of up to about 60 inches. Vehicle 100 also has a ground clearance "c" of about at least 7 inches. By collapsing roll cage 400, vehicle 100 may be placed in areas that have a smaller height envelope, such as the transport hold of an airplane. As best shown in FIG. 16B, a seat frame 410 does not rotate with upper frame members 402A and 402B. As such, seats 116 remain in the same position regardless of whether roll cage 400 is in the raised position of FIGS. 15A and 15B or the lowered position of FIGS. 16A and 16B. Further, the openness of rear, upper frame members 402A and 402B and front, upper frame members 404A and 404B allow an operator to sit in seat 116 and drive vehicle 100 into a transport hold of an airplane with roll cage 400 in the lowered position.

By having both the front portion and the rear portion of roll cage 400 rotate towards each other, roll cage 400 may be moved to the lowered position while front platform 140 and rear platform 150 are fully loaded with cargo.

Roll cage 400 is moved from the raised position to the lowered position in the following manner. First couplers 420 are removed or otherwise manipulated to uncouple rear, upper frame members 402A and 402B from the respective front, upper frame members 404A and 404B. Second, the lock members of hinges 412 are removed, in the case of bolts, or otherwise manipulated to permit the rotation of rear, upper frame members 402A and 402B relative to rear, lower frame members 401A and 401B. Rear, upper frame members 402A and 402B may now be rotated forward to lower rear upper frame members 402A and 402B relative to rear, lower frame members 401A and 401B. Third, the lock members of hinges 414 are removed, in the case of bolts, or otherwise manipulated to permit the rotation of front, upper frame members 404A and 404B relative to front, lower frame members 403A and 403B. Front, upper frame members 404A and 404B may now be rotated forward to lower front upper frame members 404A and 404B relative to front lower frame members 403A and 403B.

In one embodiment, roll cage 400 is held in the lowered position by straps, such as bungees, wrapped around roll cage 400 and coupled to the frame of vehicle 100. In one embodiment, roll cage 400 is held in the lowered position by coupling the uncoupled portions of rear, upper frame members 402A and 402B and front, upper frame members 404A and 404B to brackets (not shown) provided in operator cab 114.

Figure 18A:
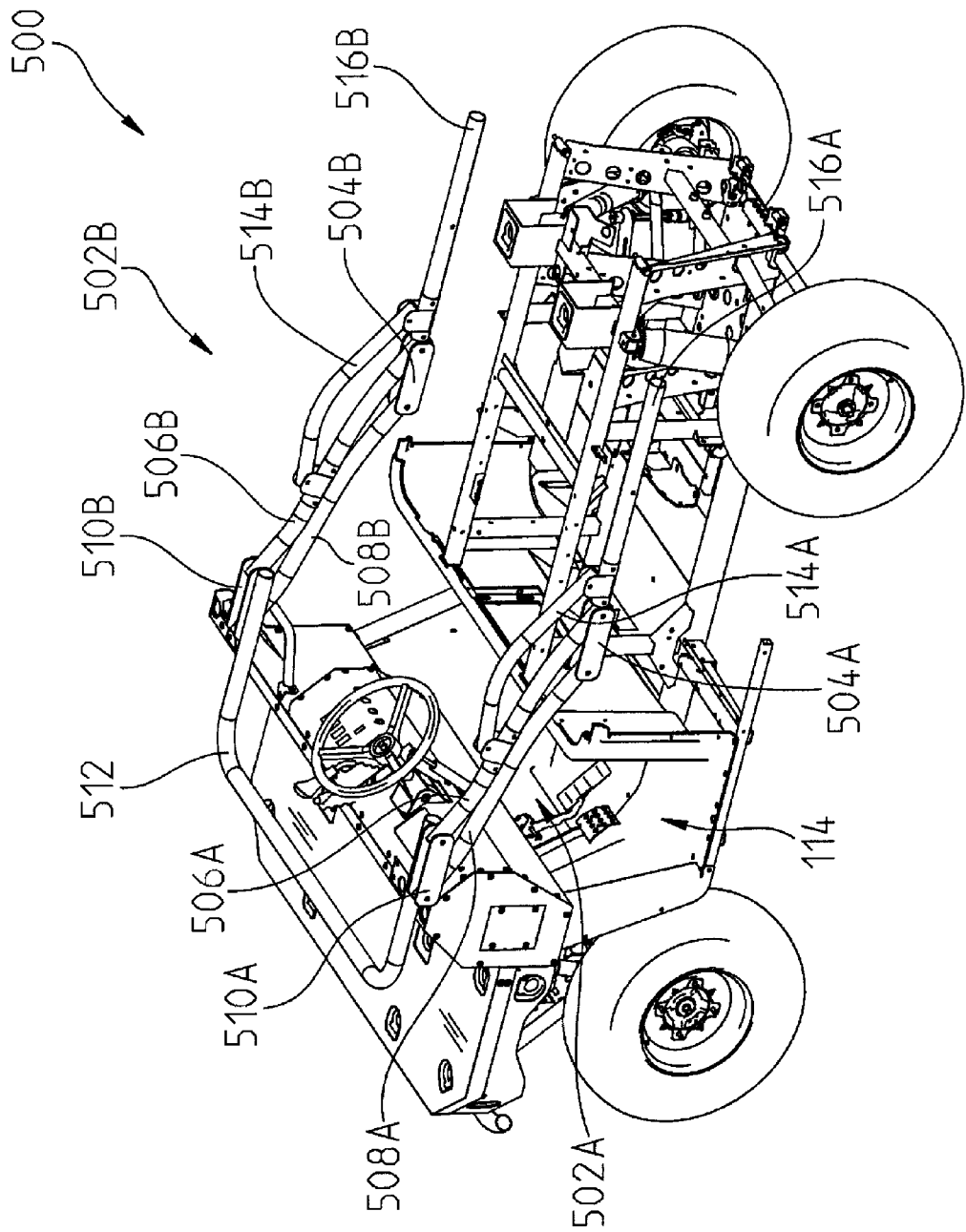
FIG. 18A is the front perspective view of FIG. 17A with the roll cage being in a lowered configuration.
Figure 18B:
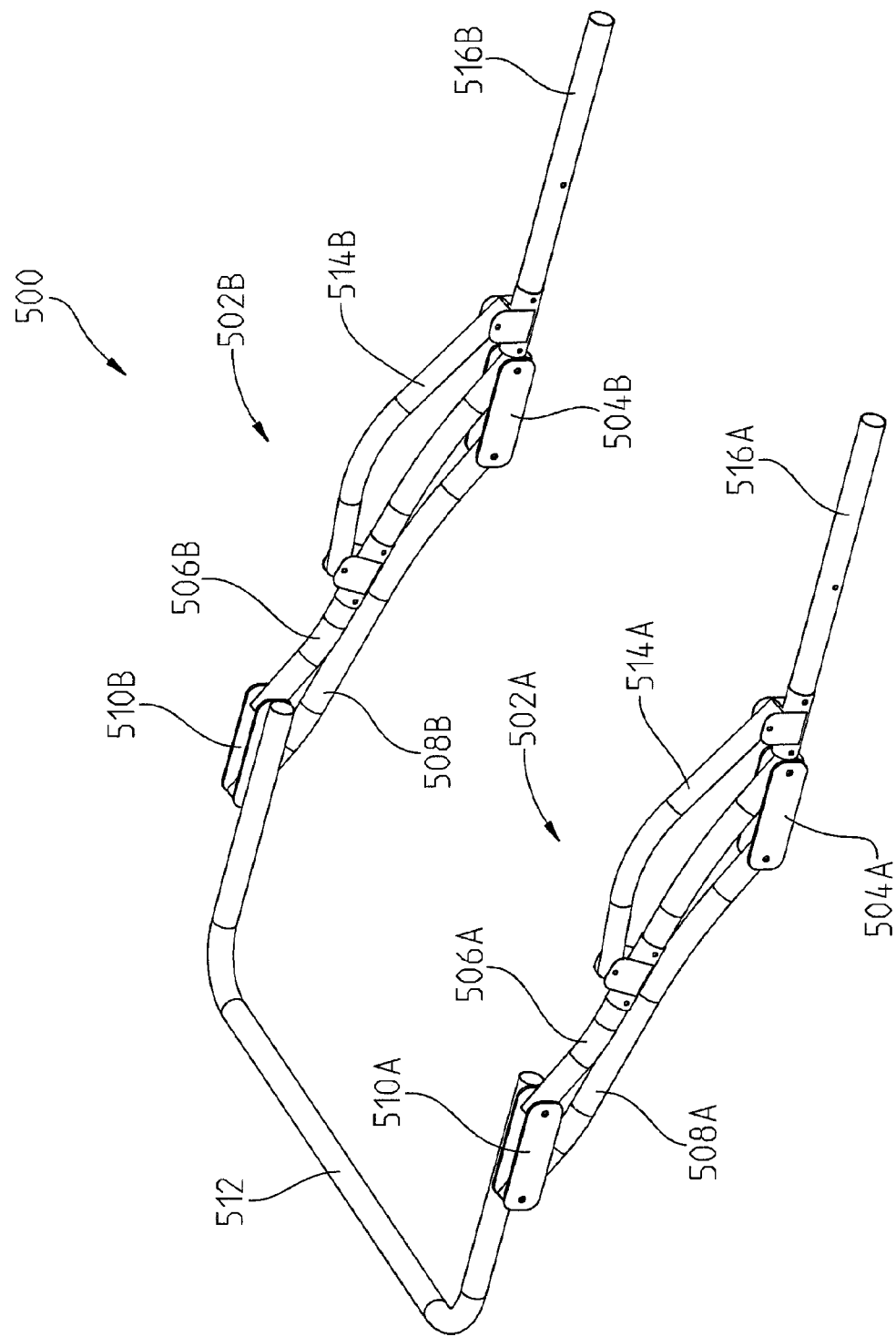
FIG. 18B is the front perspective view of FIG. 17B with the roll cage being in a lowered configuration.

Referring to FIGS. 17A-B and 18A-B, a roll cage 500 is shown. Roll cage 500, like roll cage 400, is moveable between a raised position (FIG. 17A-B) and a lowered position (FIG. 18A-B). Further, like roll cage 400, roll cage 500 moves from the raised position to the lower position within the confines of operator area 114 and without moving the seats (not shown).

Roll cage 500 includes a pair of four bar linkages 502A and 502B. Each four bar linkage 502A and 502B includes a base link 504A and 504B, a first upstanding link 506A and 506B rotatably coupled to the respective base link 504A and 504B, a second upstanding link 508A and 508B rotatably coupled to the respective base link 504A and 504B, and an upper link 510A and 510B rotatably coupled to the respective first upstanding link 506A and 506B and the respective second upstanding link 508A and 508B. Four bar linkages 502A and 502B are connected through an upper frame member 512 which extends over operator area 114.

Each of first upstanding link 506A and 506B of the respective four bar linkages 502A and 502B is coupled to a respective input link 514A and 514B. Each respective input link 514A and 514B is slidably coupled to a frame member 516A and 516B and may have its position fixed along the length of the respective frame members 516A and 516B with a lock member, such as a bolt.

As shown in FIG. 18B, by sliding input links 514A and 514B forward the respective four bar linkages 502A and 502B rotate such that the respective upper links 510A and 510B and frame member 512 are lowered.

Figure 19:
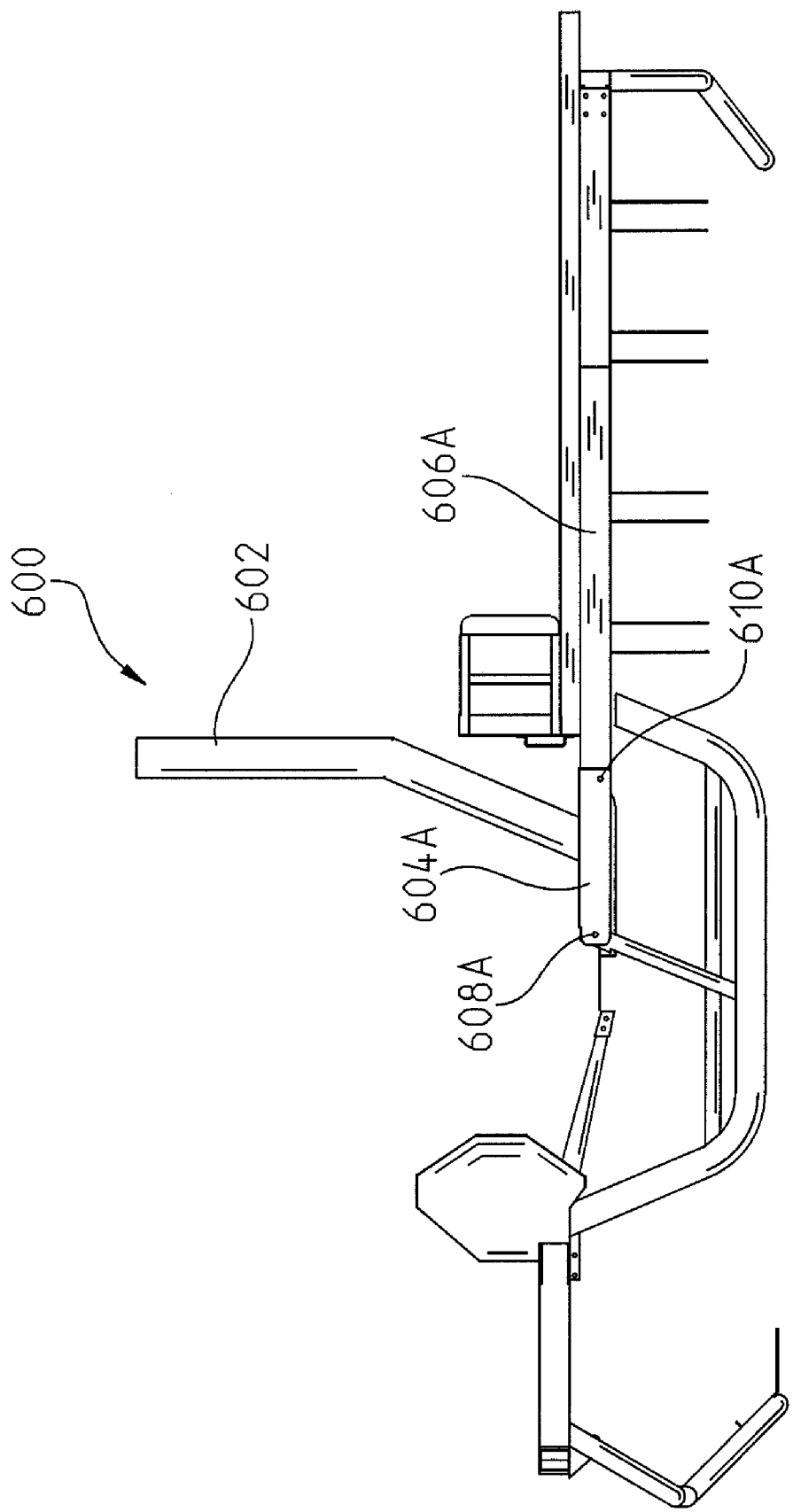
FIG. 19 is a side view of a third exemplary collapsible roll cage, the roll cage being in a raised configuration.
Figure 20:
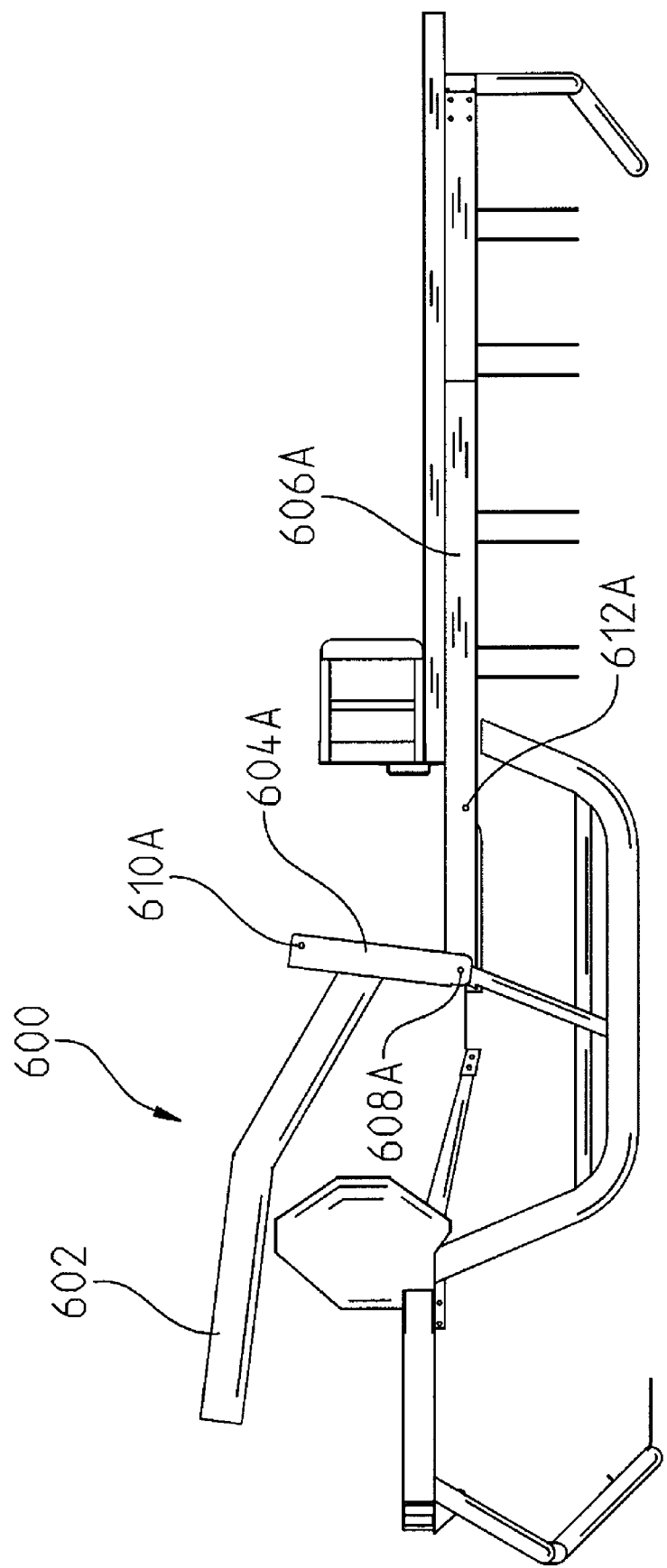
FIG. 20 is the side view of FIG. 19 with the roll cage being in a lowered configuration.

Referring to FIGS. 19 and 20, a roll cage 600 is shown. Roll cage 600, like roll cage 400, is moveable between a raised position (FIG. 19) and a lowered position (FIG. 20). Further, like roll cage 400, roll cage 600 moves from the raised position to the lowered position within the confines of operator area 114 and without moving the seats (not shown).

Figure 21:
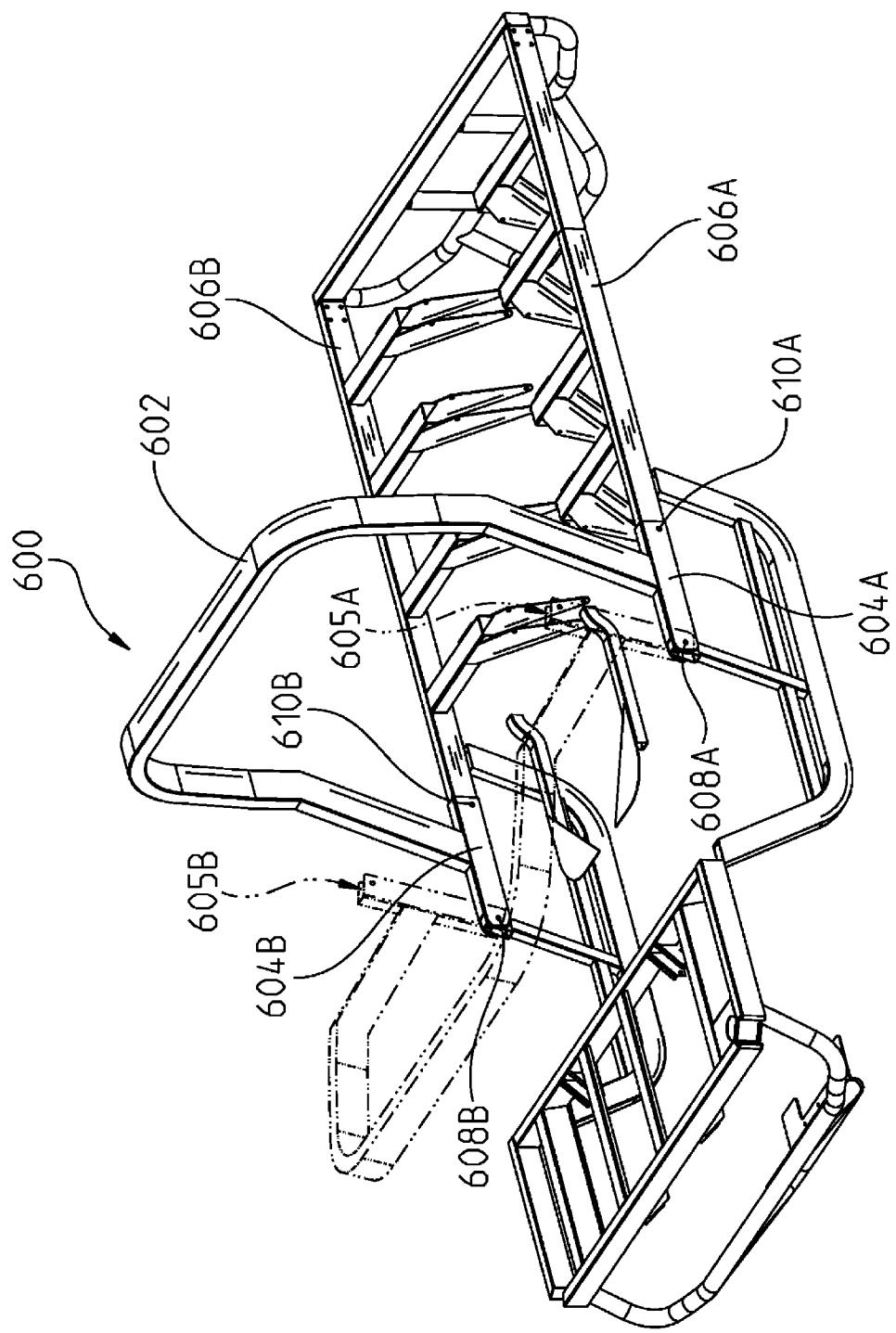
FIG. 21 is a perspective view of the roll cage of FIG. 19.

Roll cage 600 includes a single upstanding generally U-shaped frame member 602 which spans operator area 114 from side to side (see FIG. 21). Frame member 602 is coupled to base frame members 604A and 604B. Base frame members 604A and 604B are generally U-shaped and include a recess 605A and 605B, respectively, into which respective frame members 606A and 606B are received.

Base frame members 604A and 604B are rotatably coupled to frame members 606A and 606B at 608A and 608B. Roll cage 600 is shown in a raised position in FIG. 19 and FIG. 21. Roll cage 600 is shown in a lowered position in FIG. 20 and in phantom in FIG. 21.

A respective lock member, such as a bolt, is received in apertures 610A and 610B in roll cage 600 and in apertures 612A and a corresponding aperture in frame member 606B when roll cage 600 is in the raised position of FIG. 19.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A vehicle for use with a harness to support the vehicle when the vehicle is in the air, the vehicle comprising:
   a plurality of ground engaging members;
   a frame supported by the plurality of ground engaging members;
   an engine supported by the frame and operatively coupled to at least a portion of the plurality of ground engaging members;
   an operator area supported by the frame, the operator area including seating for at least two occupants in a side-by-side arrangement, steering controls operatively coupled to at least one of the plurality of ground engagement members, and engine controls operatively coupled to the engine; and
   a roll cage supported by the frame, the roll cage having a raised position wherein the roll cage is positioned to protect the operator area and a lowered position, the seating remaining stationary as the roll cage is moved between the raised position and the lowered position and the steering controls and engine controls being accessible by an occupant when the roll cage is in the lowered position, wherein the roll cage includes a pair of four bar linkages supporting opposite ends of an upper frame member which extends over the operator area and at least one of the four bar linkages is rotatably coupled to an input link which is slideably coupled to the frame at a first end of the input link, the input link being translated to rotate the at least one of the four bar linkages to lower the upper frame member resulting in the roll cage being in the lowered position.

2. The vehicle of claim 1, further comprising a locking member to lock the location of the input member relative to the frame.

3. A vehicle for use with a harness to support the vehicle when the vehicle is in the air, the vehicle comprising:
a plurality of ground engaging members;
a frame supported by the plurality of ground engaging members;
an engine supported by the frame and operatively coupled to at least a portion of the plurality of ground engaging members;
an operator area supported by the frame, the operator area including seating for at least two occupants in a side-by-side arrangement, steering controls operatively coupled to at least one of the plurality of ground engagement members, and engine controls operatively coupled to the engine; and
a roll cage supported by the frame, the roll cage having a raised position wherein the roll cage is positioned to protect the operator area and a lowered position, the seating remaining stationary as the roll cage is moved between the raised position and the lowered position and the steering controls and engine controls being accessible by an occupant when the roll cage is in the lowered position, wherein the roll cage includes a first member rotatably coupled to the frame on a first side of a center plane of the vehicle, a second member rotatably coupled to the frame on a second side of the center plane of the vehicle, and an upper portion which is supported by the first member and the second member and spans across the operator area and wherein at least one of the first member and the second member includes a recess into which a portion of the frame is received when the roll cage is in the raised position.

4. The vehicle of claim 1, wherein the roll cage moves from the raised position to the lowered position within the operator area.

5. The vehicle of claim 1, wherein the upper frame member extends forward of the pair of four bar linkages.

6. The vehicle of claim 1, wherein the upper frame member is parallel to an upper link of a first one of the four bar linkages.

7. The vehicle of claim 6, wherein the upper frame member remains parallel to the upper link as the roll cage moves from the raised position to the lowered position.

8. The vehicle of claim 1, further comprising
a first set of attachment devices positioned forward of the seating and coupled directly to the frame; and
a second set of attachment devices positioned rearward of the seating and coupled directly to the frame, the first set of attachment devices and the second set of attachment devices being adapted to be removably coupled to a harness, wherein the first set of attachment devices are located forward of a center of gravity of the vehicle, the second set of attachment devices are located rearward of the center of gravity of the vehicle, and both of the first set of attachment device and the second set of attachment devices are located above the center of gravity of the vehicle.

9. The vehicle of claim 8, further comprising a cargo platform supported by the frame wherein at least a first attachment device of the first set of attachment devices and the second set of attachment devices are positioned within a periphery of the cargo platform and are accessible from above the cargo platform.

10. The vehicle of claim 9, wherein the cargo platform includes an opening aligned with the first attachment device to provide access to the first attachment device from above the cargo platform.

11. The vehicle of claim 10, wherein a top portion of the first attachment device is flush with or below a cargo carrying surface of the cargo platform.

12. The vehicle of claim 9, wherein at least a second attachment device of the first set of attachment devices and the second set of attachment devices is positioned outside of a periphery of the cargo platform.

13. The vehicle of claim 12, wherein the second attachment device is positioned laterally outward from the cargo platform.

14. The vehicle of claim 3, wherein the roll cage moves from the raised position to the lowered position within the operator area.

15. The vehicle of claim 3, wherein the first member, the second member, and the upper portion are part of a single generally U-shaped frame member.

16. The vehicle of claim 3, further comprising a lock member to lock the roll cage in the raised position.

17. The vehicle of claim 3, further comprising
a first set of attachment devices positioned forward of the seating and coupled directly to the frame; and
a second set of attachment devices positioned rearward of the seating and coupled directly to the frame, the first set of attachment devices and the second set of attachment devices being adapted to be removably coupled to a harness, wherein the first set of attachment devices are located forward of a center of gravity of the vehicle, the second set of attachment devices are located rearward of the center of gravity of the vehicle, and both of the first set of attachment device and the second set of attachment devices are located above the center of gravity of the vehicle.

18. The vehicle of claim 17, further comprising a cargo platform supported by the frame wherein at least a first attachment device of the first set of attachment devices and the second set of attachment devices are positioned within a periphery of the cargo platform and are accessible from above the cargo platform.

19. The vehicle of claim 18, wherein a top portion of the first attachment device is flush with or below a cargo carrying surface of the cargo platform.

20. The vehicle of claim 18, wherein at least a second attachment device of the first set of attachment devices and the second set of attachment devices is positioned outside of a periphery of the cargo platform.

* * * * *